United States Patent
Patel et al.

(10) Patent No.: US 6,611,342 B2
(45) Date of Patent: Aug. 26, 2003

(54) NARROW BAND POLARIZATION ENCODER

(75) Inventors: Jayantilal S. Patel, State College, PA (US); Zhizhong Zhuang, Yardley, PA (US)

(73) Assignee: Optellios, Inc., Ewing, NJ (US)

(*) Notice: Subject to any disclaimer, the term of this patent is extended or adjusted under 35 U.S.C. 154(b) by 27 days.

(21) Appl. No.: 09/952,570

(22) Filed: Sep. 14, 2001

(65) Prior Publication Data

US 2003/0020925 A1 Jan. 30, 2003

Related U.S. Application Data

(60) Provisional application No. 60/260,247, filed on Jan. 8, 2001.

(51) Int. Cl.[7] .................................................. G01B 9/02
(52) U.S. Cl. ........................................................ 356/519
(58) Field of Search ................................ 356/454, 491, 356/515

(56) References Cited

U.S. PATENT DOCUMENTS

| | | |
|---|---|---|
| 3,628,173 A | 12/1971 | Danielmeyer |
| 4,305,046 A | 12/1981 | Le Floch |
| 4,973,120 A | 11/1990 | Jopson |
| 5,068,749 A | 11/1991 | Patel |
| 5,111,321 A | 5/1992 | Patel |
| 5,150,236 A | 9/1992 | Patel |
| 5,321,539 A | 6/1994 | Hirabayashi et al. |
| 5,381,253 A | 1/1995 | Sharp |
| 5,452,127 A | 9/1995 | Wagner |
| 5,552,912 A | 9/1996 | Sharp |
| 5,557,468 A | 9/1996 | Ip |
| 5,588,013 A | 12/1996 | Reitz |
| 5,684,623 A | 11/1997 | King |
| 5,710,655 A | 1/1998 | Rumbaugh |
| 5,995,522 A | 11/1999 | Scherrer |
| 6,125,220 A | 9/2000 | Copner et al. |
| 6,154,591 A | 11/2000 | Kershaw |
| 6,205,159 B1 | 3/2001 | Sesko |
| 6,208,444 B1 | 3/2001 | Wong et al. |
| 6,222,958 B1 | 4/2001 | Paiam |

OTHER PUBLICATIONS

L. J. Cimini, Jr., L. J. Greenstein, and A. A. M. Saleh, "Optical Equalization to Combat the Effects of Laser Chirp and Fiber Dispersion," Journal of Lightwave Technology, vol. 8, No. 5, pp. 649–659, May 1990.
B. B. Dingel, and M. Izutsu, "Optical wave–front transformer using the multiple–reflection interference effect inside a resonator," Optics Letters, vol. 22, No. 19, pp. 1449–1451, Oct. 1, 1997.

*Primary Examiner*—Frank G. Font
*Assistant Examiner*—Michael A. Lyons
(74) *Attorney, Agent, or Firm*—Duane Morris LLP

(57) ABSTRACT

An interferometer optical element is provided with a birefringent material in the light path. Specifically, a Fabry-Perot optical resonance cavity is operated in a fully reflective mode and is provided with a birefringent material in a cavity between two reflectors. A first mirror, for example of about 90% reflectance and a second mirror, for example of 99% reflectance, define the cavity. The polarization effect is applied exclusively to the resonant wavelength defined by the spacing of the two reflectors. The input beam is fully reflected back in the direction of incidence. However the resonant wavelength component therein is polarized and can be discriminated, e.g., selectively diverted by a polarization beam splitter. A number of application are disclosed, including using a birefringent liquid crystal material and tuning the apparent optical path length by electrically adjusting the birefringence. The device also is cascadable for selectively operating on certain wavelengths and diversely polarizing some wavelengths and not others. In a preferred embodiment, the input beam is applied at 45 degrees to the fast axis of oriented birefringent nematic liquid crystal, which can optionally involve separately altering and recombining diverse polarization components of the input beam.

40 Claims, 22 Drawing Sheets

NARROW BAND POLARIZATION ENCODER

CROSS REFERENCE TO RELATED APPLICATION

This application claims the priority of U.S. Provisional Patent Application S No. 60/260,247, filed Jan. 8, 2001.

BACKGROUND OF THE INVENTION

1. Field of the Invention

The invention relates to the field of optical wavelength selection to enable optical energy to be processed selectively as a function of wavelength. In particular, the invention provides a tunable narrow band polarization encoder.

According to an inventive aspect, a Fabry-Perot element (an "etalon" comprising two reflectors spaced along a beam path) is used in a reflective mode, with the cavity between the reflectors containing a preferably-controllable birefringent material. The second reflector can be highly reflective, such that all or a high proportion of the incident light energy is reflected back along the path of the incident beam. The birefringent material imparts a polarization transformation exclusively to the resonant wavelength component (or components) of the input beam.

The resonant components have an effective optical path between the first and second reflectors of the Fabry-Perot element or etalon that is equal to, or has an integer multiple that is equal to, half the resonant wavelength. The entire input beam could be reflected by a reflective Fabry-Perot, but the polarization transformation is applied to the wavelength(s) that resonate in the cavity. The situation is such that most or all of the light is reflected, but the nonresonant component is reflected at the first reflector and the resonant component is affected by the cavity.

A birefringent material can be disposed in the cavity. A birefringent material has two refractive indices, $n_e$ and $n_o$. An incident beam that is aligned on an angle $\theta$ can be divided into orthogonal polarization components parallel to the $n_e$ and $n_o$ birefringent axes. The polarization aspect adds another factor because one of the different polarization components may be resonant while the other is not.

In any event, a polarization transformation can be arranged according to the invention to produce a polarization condition that thereafter can be used as a criterion to discriminate or separate the wavelength from the remainder of the beam, for example using a polarization filter or beam splitter. This has some very useful applications.

According to a further inventive aspect, control of a birefringent element in the cavity, such as applying a control voltage to a liquid crystal birefringent element, adjusts the effective optical length of the path between the reflectors, at least for one polarization axis aligned to $n_e$ or $n_o$ of the incident beam, permitting tuning for selection of the resonant wavelength that undergoes polarization transformation.

The first reflector is preferably highly reflective and the second reflector can be substantially completely reflective (e.g., over 99%), or perhaps allowing a small amount of light to pass through to a monitoring sensor. The reflectors turn a high proportion of the light energy backwards along the path of the incident beam. However the resonant wavelength of the Fabry-Perot etalon has an altered polarization orientation (rotated 90 degrees in an exemplary embodiment described below). This distinct polarization attribute marks the resonant wavelength and provides an aspect whereby it is possible further along the reflected beam path to discriminate for that wavelength.

A number of specific applications of such a reflective Fabry-Perot element are disclosed for distinct polarization marking or similarly facilitating selective processing of particular wavelengths. The elements can be employed with polarization diversity arrangements such as crystals, polarization beam splitters, half wave plates and the like, to achieve given conditions such as a predetermined reference polarization orientation in the incident beam, whereby the polarization transformation produces a detectable difference in the affected component, namely the resonant wavelength. The device can be pixilated or otherwise laterally subdivided for parallel processing of plural beams such as beams carried by separate optical fibers. The devices can be cascaded such that plural wavelengths are selected in turn, and each is distinctly polarized. These wavelengths can then be discriminated, separated or otherwise handled independently due to their distinct polarization.

An inventive Fabry-Perot element is provided with birefringent material in a cavity between at least two surfaces that are each at least partly reflective. The second reflector (or the last of a cascaded series) is preferably substantially fully reflective. The reflecting surfaces are spaced by a distance equal to one or more integral half wavelengths of a particular resonant wavelength. The action of a Fabry-Perot etalon usually is to pass light at the resonant wavelength through two spaced reflectors and to reflect other wavelengths, i.e., as a narrow bandpass filter. In the reflective mode according to the invention, the two reflective surfaces introduce a $\pi$ phase shift between two reflected beams, namely one reflected from the front reflective surface and the other from the cavity. The cavity between the reflectors contains the birefringent material.

The Fabry-Perot element can be tunable. Controllable liquid crystals preferably are used in the cavity for at least part of the birefringent material. Control of such crystal by application of a control voltage alters the effective birefringence, and is used according to the invention to adjust the effective optical distance between the reflectors as applied to one of two mutually perpendicular axes of the incident beam.

In an exemplary arrangement, the input beam can be plane polarized and oriented at 45 degrees to the fast axis of the birefringent material. The selected wavelength, namely the resonant wavelength of the beam incident on the Fabry-Perot element, undergoes a polarization transformation that the remainder of the beam does not undergo. In the example, the selected wavelength undergoes a 90 degree polarization rotation for linearly polarized light at 45 degrees with respect to the fast axis of the birefringent material in the cavity. In this example, the orientation of the plane polarized input beam is such that part of the incident light energy is affected by the polarization transformation, and the adjustable birefringence of the birefringent material permits tuning for selection of the resonant wavelength. Other arrangements and orientations are possible that allow the controllable birefringence to operate on a selected wavelength of the input beam, provided that the necessary conditions are present (e.g., the resonant wavelength must be present in the input and appropriately aligned, etc.). For example, the tuning arrangement can be coupled to other tuning arrangements, such as piezoelectric tuning controls for adjusting spacing, electroclinic crystal controls for adjusting the orientation of the birefringence, etc.

A number of additional aspects will become apparent in the detailed description and the examples of specific optical processing steps and elements that appear in the detailed disclosure below.

2. Prior Art

It is sometimes advantageous to separate light at one or more wavelengths from light at other wavelengths as the plural wavelengths propagate together as a group. For this purpose, a tuned or tunable wavelength-separating device is needed. Without limitation, such tuned or tunable wavelength selective devices might be helpful, for example, to enable comparative measurement of energy at a range of wavelengths (i.e., spectral content), to filter light used for illumination or reflected from a target, for modulating or demodulating specific wavelengths in wavelength modulation or in wavelength division multiplexed optical communications, and other applications. In connection with optical fibers, a primary application of such devices is in connection with applying information signals to light and extracting the information signals thereafter (modulating and demodulating). Such mechanisms require some sort of technique or mechanism by which certain wavelengths or bands are treated differently than others.

Optical wavelength division multiplexing (WDM) can provide substantial bandwidth over a signal path, for example carrying light on an optical fiber with information bearing signals transmitted simultaneously at several different wavelengths over the same optical fiber. Wavelength selective elements are used or are advantageous for purposes such as selecting a wavelength band to be modulated (by amplitude or wavelength), from a broad band or other multiple wavelength signal, or selecting a band to be demodulated, or actually modulating and/or demodulating at the selected wavelength or within a bandwidth around a center wavelength.

There are a number of potential methods for separating light at multiple wavelengths into discrete beams of the constituent wavelengths. Wavelength-dependent separating devices can range, for example, from simple refractive prisms to complex spectrometers with diffraction gratings. Such devices can cause a beam to diverge as constituent wavelengths directed at different angles, whereby the constituent wavelengths can be discriminated, directed or sensed. Other devices also are known, such as waveguide demultiplexers and multiplexers and acousto-optic devices.

Fabry-Perot devices are a known form of transmissive filter that passes only a specific wavelength determined by the resonant distance between two reflectors, and blocks other wavelengths, typically reflecting the blocked wavelengths back in the opposite direction from incident beam. Between the two spaced reflectors of a Fabry-Perot device, the light energy is reflected back and forth between the reflectors. The light energy interferes and at specific wavelengths produces a standing wave. Where the space between reflectors is equal to the length of a standing wave (precisely one half wavelength, or precisely an integral number of half wavelengths), incident light directed normal to spaced parallel reflector planes can pass through the two spaced reflectors. All other wavelengths are effectively blocked.

Therefore, a parallel spaced reflector pair or "Fabry-Perot" element or etalon may be useful as a filter to pass only a predetermined set of wavelengths. The Fabry-Perot structure, and in particular the reflector spacing, may be chosen to support resonance at plural wavelengths that are present, or the structure can be chosen to eliminate higher order modes. In a real world device, a Fabry-Perot passes a limited passband. The bandwidth is determined by dimensional variations of the cavity between the reflectors and by reflectivity. The narrowness or broadness of the passband is associated with a characterizing factor known as "finesse."

A Fabry-Perot element could consist of a static pair of reflectors rigidly spaced by an air gap, thus passing a fixed wavelength (or assuming integer multiples, a fixed set of wavelengths). A Fabry-Perot may be arranged to filter for a selected tunable wavelength by providing a means to change the effective optical cavity length between the reflectors in one way or another. The cavity length might be changed by moving either or both of the parallel reflectors toward or away from one another. Alternatively, the physical spacing between the reflectors could be unvarying, but the index of the material in the cavity might be changeable. For example, it is known to use controllable liquid crystals in a cavity of a light transmissive Fabry-Perot, and to select the wavelength that is transmitted by changing the index of the liquid crystal in the cavity.

Known Fabry-Perot devices necessarily are transmissive rather than reflective. There is no reason to select a particular wavelength if that selected wavelength is immediately recombined with the wavelengths that were not selected. Such recombination occurs inherently if the Fabry-Perot is reflective rather than transmissive. The point of Fabry-Perot devices is to separate a selected bandpass wavelength from other wavelengths and to allow only the selected wavelength to pass. The passed wavelength(s) is (are) directed along an optical path that is different from the paths of other wavelengths that are not selected. If one considers a reflective device of this type, the effect would be to direct the selected wavelength along the same optical path as the non-selected remaining wavelengths, thus making no change in polarization properties. Any benefit associated with selecting a particular wavelength would be lost when the selected and unselected portions were recombined.

A Fabry-Perot element is resonant at a particular wavelength because its reflectors are spaced to correspond to that wavelength (actually one half-wavelength) and a standing wave is produced between the reflectors. Wavelengths other than the resonant wavelength are reflected but the resonant wavelength is passed or transmitted through the element or etalon. The element is a narrow passband filter that passes only its resonant wavelength. An example of a Fabry-Perot etalon having this narrow bandpass characteristic is disclosed, for example, in U.S. Pat. No. 5,321,539—Hirabayashi et al. That patent also discloses using a liquid crystal material in the cavity between the Fabry-Perot etalon reflectors. A liquid crystal material can be oriented along a so-called buffing or rubbing axis and controlled anisotropically, by application of an electric field. The liquid crystal defines a different optical path length along mutually perpendicular axes for mutually perpendicular polarization components of an incident beam. In this manner, polarized light aligned at the required orientation, or at least having a vector component at the required orientation, can be caused to traverse an optical path having a length that can be modified by an electrical signal. With reference to the Fabry-Perot etalon, the resonant wavelength is changeable along that path and thus the resonant wavelength can be electrically selected. The device can be tuned.

This aspect of a Fabry-Perot element is useful in a bandpass application to pass only the selectively tuned resonant wavelength desired. Whether or not tuned, for the reasons discussed above, there is no apparent use for such a characteristic in a reflective device rather than a transmissive one. Whether or not tuned, the selected resonant wavelength would be recombined with the non-selected wavelengths in a reflective device. Whether tuned or not, any benefit associated with the selection or discrimination is lost because the wavelengths are recombined.

Various devices have been produced to take advantage of the selective nature of a Fabry-Perot element in a forward or transmissive direction. Examples include, for example, U.S. Pat. Nos. 5,068,749, 5,111,321 and 5,150,236, all to Patel; and 5,452,127—Wagner, the disclosures of which are hereby incorporated.

It is an aspect of the present invention that one or more wavelengths of a beam are marked selectively. Although the marked and unmarked wavelengths may be recombined, the marking is useful as a characteristic to select for the presence of that wavelength or to divert that wavelength, using a beam splitter, prism, grating or the like.

Examples of efforts in the areas of combining and separating wavelengths include U.S. Pat. Nos. 6,154,591—Kershaw, 6,208,444—Strong et al. and 6,222,958—Paiam. In another example, in U.S. Pat. No. 6,125,220—Copner et al., transmitted and reflected beams exiting a partly reflective etalon are processed and recombined.

What is missing in the prior art is a simple and effective way to exploit the resonant cavity aspects of a Fabry-Perot or another similar resonant optical cavity device (such as a ring resonator) in a wholly reflective way. The prior art lacks an effective way to apply an incident beam to an optical element that marks one or more preferably-tunably-selected resonant wavelengths in a way that permits those specific wavelengths to be discriminated, and returns the whole incident beam, including those wavelengths (now distinctively marked) and the other wavelengths as well.

SUMMARY OF THE INVENTION

It is an object of the invention to provide a polarization-based method and apparatus wherein an optical interferometer contains a birefringent material for producing a wavelength-dependent polarization transformation.

It is an object of the present invention to provide a polarization-based mechanism in association with a Fabry-Perot or similar resonant optical structure employed in a reflective mode, with a polarization transformation provides a distinctive marking aspect whereby the resonant wavelength can be separated from the remainder of the reflected light, to provide useful devices. This mechanism, preferably comprising a Fabry-Perot structure containing controllable birefringent material for tuning, produces selective narrow band polarization that is useful as an encoding device and can be used as a tunable wavelength selective device and in other ways that are discussed in this disclosure.

The invention is a tunable narrow band polarization encoder that introduces a $\pi$ phase shift between two orthogonal states of polarization of a selected narrow band in an input beam. Effectively the invention behaves like a narrow band tunable half wave plate.

In some more particular arrangements, the invention is selective by virtue of the input beam orientation. In some of the disclosed examples, the input beam is plane polarized and a wavelength selective arrangement alters the differential phase between the components corresponding to the two orthogonal birefringence axes, which results in a polarization transformation of that wavelength.

The invention is applicable to a general case in which a single wavelength of a plane polarized input beam is marked by polarization transformation and diverted by a polarization sensitive beam splitter. A number of other arrangements are also disclosed, including for example arrangements to ensure a particular input beam polarization orientation or to process the polarization transformed output. In one example the Fabry-Perots or optical resonance elements are cascaded whereby plural selected and preferably-tuned wavelengths are marked with polarization transformations permitting the marked components to be discriminated.

These and other objects are met according to the invention in a Fabry-Perot optical resonance cavity that is operated in a fully reflective mode and is provided with a birefringent material in a cavity between two reflectors. A first mirror, for example of about 90% reflectance and a second mirror, for example of 99% reflectance, define the cavity. A polarization transformation is applied exclusively to a resonant wavelength that is defined by the spacing of the two reflectors and by the orientation of the birefringent medium, which is preferably tunably controllable. Preferably, the entire input beam is reflected back in the direction of incidence. However the resonant wavelength component therein has experienced a polarization transformation whereby the resonant wavelength differs from the non-resonant wavelengths. This difference permits discrimination for the resonant wavelength, for example, for selective diversion using a polarization beam splitter. A number of applications are disclosed, including using a birefringent liquid crystal and tuning the apparent optical path length by electrically adjusting the birefringence. The device also is cascadable for selectively operating on certain wavelengths and diversely polarizing some wavelengths and not others. In one embodiment wherein the purpose is to separate the resonant wavelength, the input beam can be applied at 45 degrees to the slow axis of buff-oriented birefringent nematic liquid crystal. Additional variations also are possible.

BRIEF DESCRIPTION OF THE DRAWINGS

The drawings illustrate certain embodiments of the invention as presently preferred. It should be understood that the invention is subject to certain variations from the illustrated embodiments, which are nevertheless in keeping with the invention encompassed by the appended claims, particularly insofar as the concepts taught in this disclosure are applied to practical devices. In the drawing figures.

DETAILED DESCRIPTION OF THE PREFERRED EMBODIMENTS

The invention is based upon and exploits the discovery that an optical resonant chamber such as a Fabry-Perot element is useful a reflective mode provided that a birefringent structure is arranged to affect the resonant wavelength only. In particular, a birefringent material is provided in the cavity of a Fabry-Perot to impart a distinct polarization transformation to the resonant wavelength. The resulting polarization attribute can later be used to discriminate for the resonant wavelength in one way or another.

Figure 1:
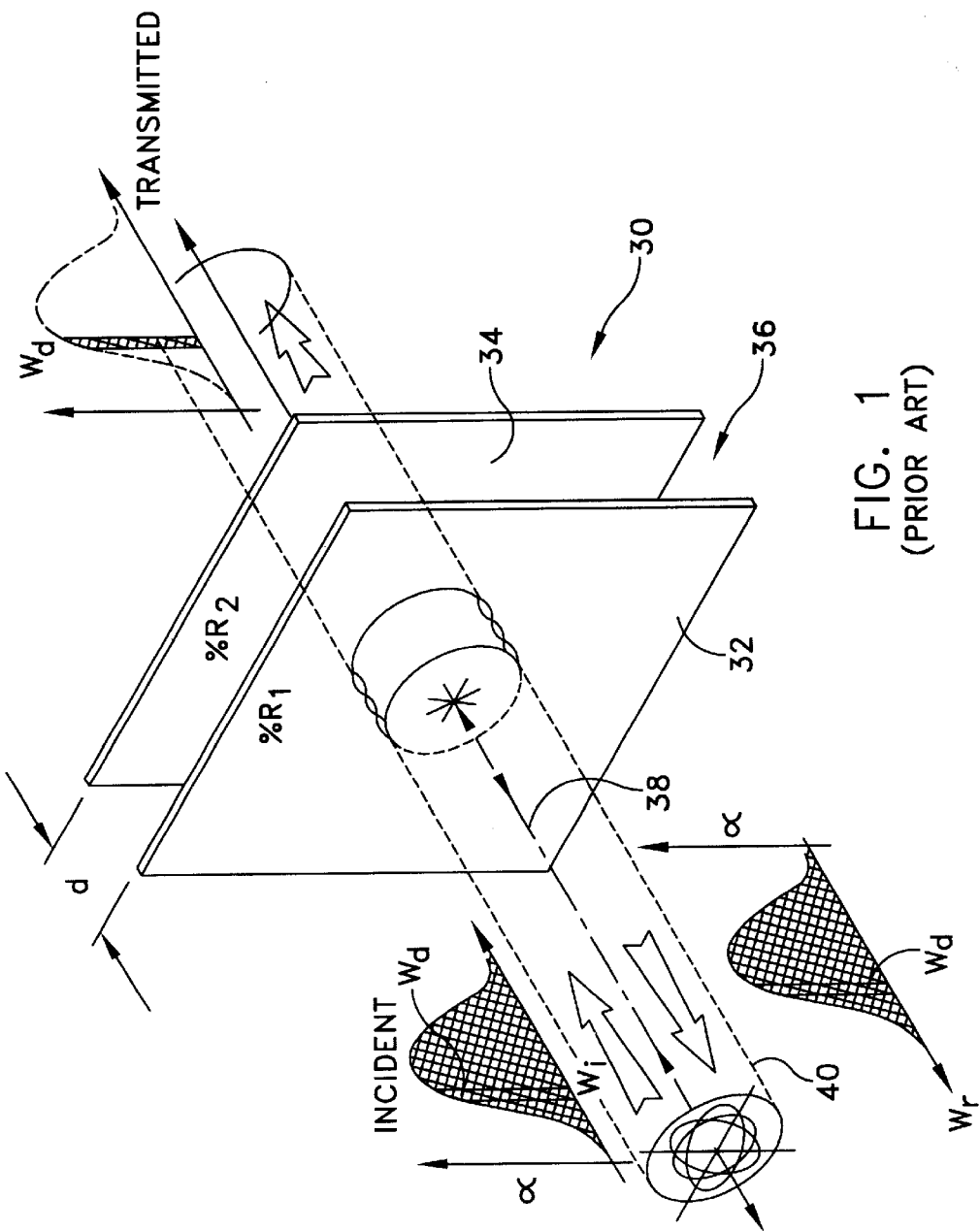
FIG. 1 is a schematic illustration of a conventional Fabry-Perot transmissive device, which passes a particular resonant wavelength from an incident signal including the resonant wavelength and one or more non-resonant wavelengths, the latter being blocked and reflected back in the direction of incidence.

Referring to FIG. 1, labeled "prior art," a Fabry-Perot element 30 conventionally comprises two parallel reflectors 32, 34, that are separated by a gap 36. The distance d across the gap 36, in a direction parallel to the beam path 38 of an incident light beam 40, which is normal to the plane of each reflector 32, 34, corresponds to an integral multiple of half-periods of a resonant wavelength $\omega_d$ (which integral multiple can be one or unity or some other integer).

In FIG. 1, the incident light beam 40 and the transmitted and reflected light beams that result by operation of the Fabry-Perot 30, are shown graphically in spectral diagrams of amplitude ∀ as a function of wavelength ω. The Fabry-Perot reflectors, 32, 34 in the known transmissive Fabry-Perot structure have respective reflectivities, % R1 and % R2, such that most of the light energy is reflected back in the direction of incidence. However, the reflectors 32, 34 of the known transmissive Fabry-Perot form a resonant structure. At a particular wavelength (or a number of wavelengths, considering integer multiples), the spacing d of gap 36 is such that a standing wave is produced in the cavity between the reflectors. By virtue of positive interference and this standing wave, light at this resonant wavelength is transmitted through the two reflectors, whereas the remainder of the light incident on the device is reflected back along the direction of the incident beam. The incident beam contains the resonant wavelength $\omega_d$. Only that wavelength $\omega_d$ passes or is transmitted through the known transmissive Fabry-Perot 30.

Figure 2:
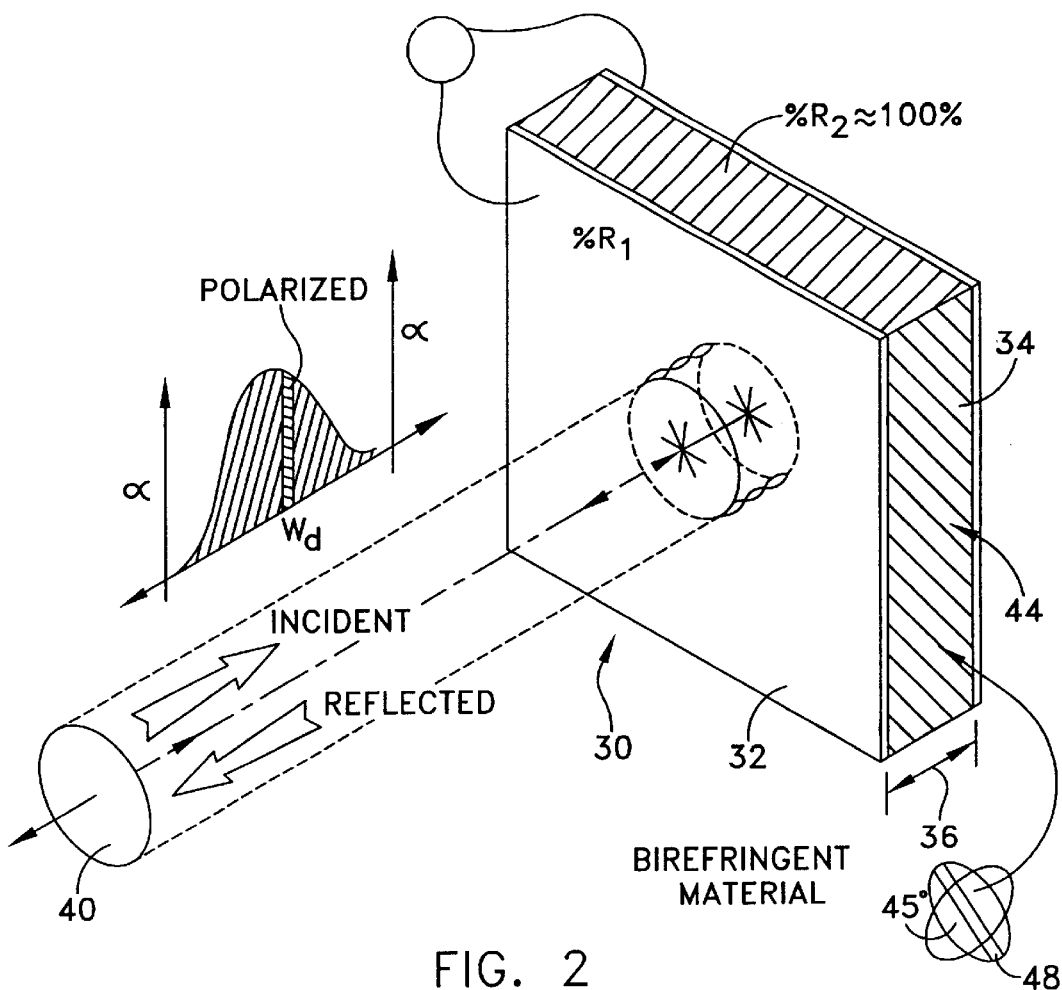
FIG. 2 is a schematic illustration according to an inventive aspect, wherein a Fabry-Perot device is provided with a birefringent material in the cavity between the reflectors and is operated in a reflective mode. The Fabry-Perot device in this embodiment operates to change the polarization of the resonant wavelengths or passband. The polarization-transformed reflected passband is combined with the remainder of the incident beam, which is reflected without polarization transformation, at the surface of the Fabry-Perot.

The present invention is illustrated in one embodiment in FIG. 2. The same reference numbers are used in FIG. 2 and throughout the drawings to identify comparable structures.

According to the invention as shown in FIG. 2, a Fabry-Perot is substantially reflective instead of transmissive. The front reflector 32 is a partial reflector, for example with a reflectivity of over 90% but not total reflectivity. The rear reflector 34 can be a substantially full 100% reflector, e.g., a gold coating with 99.9% reflectivity, or could have a lower reflectivity for some applications, for example to permit a monitor sensor or the like along a transmissive path to receive light energy passing through both reflectors. Thus the Fabry-Perot resonant element 30 operates substantially or exclusively in a reflective mode and not a transmissive one.

According to an inventive aspect, the gap between reflectors 32, 34 in the inventive device of FIG. 2, is occupied by a birefringent material 44, such as a liquid crystal. The resonant wavelength(s) are subjected to a polarization transformation. The remaining wavelengths are simply reflected and their polarization conditions are not altered. This amounts to altering a polarization attribute of the resonant wavelength, namely inducing a detectable differential phase condition.

In this description, liquid crystals are used as examples of the birefringent material 44 contained in the Fabry-Perot cavity 36. An advantage of liquid crystal as a birefringent material is that the birefringence is controllable by application of an electric signal, of modest voltage. By electrically adjusting the extent of birefringence, the optical path length through the crystal is adjusted along one of two mutually perpendicular axes (generally termed $n_e$ and $n_o$). The discussion of liquid crystals as an exemplary or preferred birefringent material is not meant to exclude the possibility of other birefringent materials, whether the birefringence is controllable or preset.

In general, the inventive reflective Fabry-Perot device behaves as a tunable half-wave plate operable at a resonant frequency or wavelength defined by the length of the optical path according to the tunable birefringent axis, which alters the polarization of the resonant frequency of the incident light beam and returns the entire light beam in the opposite direction from the direction of incidence. The can be appreciated with an understanding of the physical and optical properties that could conceivably vary.

One can consider a generalized Fabry-Perot element having front and rear reflectors (mirrors) that are both at least substantially reflective and preferably at least the rear one is highly reflective. The reflectors are planar, parallel, normal to and spaced along the optical axis of an incident beam. According to the invention the reflectors have a birefringent medium in the gap between them.

The incident beam and the birefringent material can be referenced to a rotational position in the normal plane, for considering their polarization aspects or effects. The birefringent material can be considered to be aligned to an optical reference or axis of angle θ. The polarization state of the incident beam may vary relative to this reference angle θ.

The medium in the gap between the reflectors is birefringent. That is to say that there are two refractive indices: $n_e$ and $n_o$. Unless the incident light happens to be plane polarized exclusively at one of the two orthogonal axes corresponding to the distinct birefringence axes having indices $n_e$ and $n_o$, the incident beam can be divided into two orthogonal components, having polarization states parallel to the axes for refractive indices $n_e$ and $n_o$, respectively. We will assume for the moment that the incident beam at issue has components at both polarization states, such that all wavelengths in the incident beam have some portion corresponding to each of the orthogonal components. We can also assume that all wavelengths are present over a bandwidth of interest. It will become apparent in the discussion that follows below, that there are useful situations where the polarization states and/or the population of incident bandwidths are special cases, but for initially we can assume that all such components, states and bandwidths are represented.

If one of the two polarization components satisfies the resonant condition regarding the length of the optical path between the reflectors, but the other polarization component does not, then the non-resonant part of the light is reflected from the front mirror and the resonant part of light is resonant inside the cavity and accumulates an additional π phase. However, whether or not the resonant condition is met depends in part on whether the refractive index is $n_e$ or $n_o$. This shows that the question of resonance in the Fabry-Perot cavity is not only a question of wavelength, but also is a question of polarization state and/or orientation.

Because of the π phase difference between the two orthogonal components of the light for the resonant wavelength, the device behaves like a waveplate oriented at angle θ. The retardation of the waveplate is half-wave (i.e., π) for the resonant wavelength.

The reflective Fabry-Perot behaves like a waveplate only for the wavelengths that are on or close to resonance. For other wavelengths, the reflective Fabry-Perot behaves just like an ordinary mirror.

For the wavelength that is "exactly" on resonance, the phase retardation is half-wave (π), which is the theoretical ideal case. There is also a bandwidth aspect to be considered, and the device operates to an extent on wavelengths that are close to the exact resonant wavelength. For wavelengths that vary slightly from resonance, the magnitude of the phase retardation varies as a function of the extent of difference in wavelength between the respective wavelength under consideration, and the resonant wavelength. In other words, for wavelengths that are very far from resonance, the phase retardation is zero. The phase retardation approaches π as the wavelength approaches the resonance wavelength. The spectral bandwidth of non-zero retardation around phase retardation of π at the resonant center wavelength, is dependent on the attribute of the Fabry-Perot element known as "finesse."

Applying the foregoing for the special case where the incident light is linearly polarized at an angle φ, the state of polarization of the resonant wavelength will remain linear but rotated by 2(θ-φ).

For the special case, when θ=45° and the incident light is linearly polarized at 0° or 90°, the state of polarization will be rotated by 90° with respect to the state of polarization of the off-resonant wavelength. This provides a means to completely separate the resonant and off-resonant wavelength.

Figure 3:
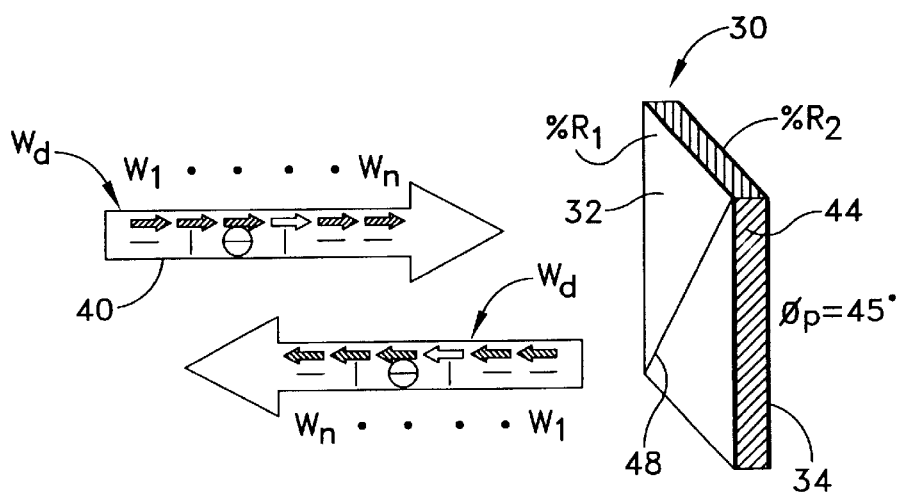
FIG. 3 is a schematic illustration corresponding to FIG. 2, and illustrates operation for incident light that is polarized differently for different wavelengths, and wherein the polarization angle of a component $\omega_d$ is altered by the Fabry-Perot element or etalon.

As shown in FIG. 2 and in the schematic representation of FIG. 3 (which shows the polarization transformation of the resonant wavelength $\omega_d$), an incident beam 40 is applied to the inventive device 30. The component wavelengths of this incident beam may be randomly polarized or plane polarized at one or more angles oriented on both sides of a fast axis 48. For purposes of illustration, the incident beam 40 in the example of FIG. 3 includes vertical and horizontal plane polarized light of various wavelengths, and the birefringence fast axis is at 45 degrees. As a result, the vertical and horizontal plane polarized light will include a vector component corresponding to each birefringence axis $n_e$ and $n_o$. The incident beam 40 in the example shown could be randomly polarized or plane polarized but has at least a component portion that corresponds to the controllable birefringence axis of the birefringent material 44. The incident beam also has a component portion at the resonant wavelength to which the Fabry-Perot is to be tuned. These conditions enable the Fabry-Perot to produce useful effects.

Assuming, for example, that the incident beam 40 is plane polarized, it could have a vertical or horizontal orientation and would correspond with a birefringent material in which the controlled and uncontrolled axes are oriented orthogonally. According to an inventive aspect, the fast axis 48 of the birefringent material 44 is oriented at 45 degrees, which is intended to illustrate that some of the incident light is polarized in each of the perpendicular axes such that the polarization transformation produces a detectable change. The input polarization does not have to be limited to a given orientation or the same for all wavelengths.

The specific resonant wavelength $\omega_d$ that traverses the resonant Fabry-Perot cavity 36, is operated upon by the birefringent material 44 in the cavity. The non-resonant wavelengths are reflected initially and are not affected by the birefringent cavity material 44, which only operates on the resonant wavelength $\omega_d$.

One of the incident wavelengths, in particular a narrow passband $\omega_d$, is resonant, which is a characteristic of Fabry-Perot devices. The front and rear reflectors 32, 34 are spaced by an integral number of half wavelengths (one or more), such that the cavity 36 between the reflectors 32, 34 can resonate at those wavelengths with a standing wave. Conventionally, the resonant wavelength would be admitted and would pass through the two reflectors (FIG. 1), the non-resonant wavelengths being reflected at the first-encountered reflector. According to the invention (FIGS. 2 and 3), the Fabry-Perot element 30 is arranged to operate reflectively and the resonant wavelength $\omega_d$ is reflected back through the cavity and produces a reflected beam opposite to the direction of incidence.

In the embodiment shown, the rear mirror 34 according to the invention is substantially completely reflective. In general, the rear mirror is substantially reflective so as to ensure that substantial light energy is reflected back without introducing losses. However, the rear mirror need not be 100% reflective for the reflective aspects discussed herein to work effectively. Moreover, if the reflectivity of the rear mirror is large but less than 100%, a small amount of light can be allowed to pass for useful purposes. For example, a small proportion of the light could be allowed to pass for impinging on a detector placed after the rear mirror 34 along the beam path. Such a detector could have distinct advantages, for example for monitoring purposes, for developing an input signal to be used for feedback control or for other similar uses.

As shown in FIGS. 2 and 3, the incident and the reflected beams both contain all the wavelengths, including the resonant wavelength $\omega_d$, which might seem to defeat any benefit to the device. However, an inventive aspect is that the cavity of the reflective Fabry-Perot element is birefringent. The resonant wavelength or bandwidth $\omega_d$ undergoes 90-degree polarization rotation in the reflected beam, whereas the remainder of the wavelengths do not. This difference marks the resonant wavelength $\omega_d$ in a way that has useful applications, discussed in detail below. The birefringent material provides a distinct and detectable aspect to the resonant wavelength that is useful for encoding and decoding in that it provides a controllable marker for a selective wavelength of the incident/reflected light.

In the configuration shown in FIG. 2, the resonant wavelength $\omega_d$ undergoes a polarization rotation with respect to the orientation of the input polarization of that wavelength, provided there is some overlap of the fast axis 48. Inasmuch as the Fabry-Perot operates such that non-resonant wavelengths are substantially reflected at the leading surface, the change in polarization orientation applies only to the resonant wavelengths. The input polarization does not have to be the same for all wavelengths but could be at least one of the two orientations, shown in FIG. 3 as vertical and horizontal lines beneath the wavelength-representing arrows in the incident and reflected beams. For example, if the input polarization is linear and oriented at 45 degrees relative to the birefringent axis, then the polarization of the resonant wavelength will be rotated by 90 degrees.

Figure 4:
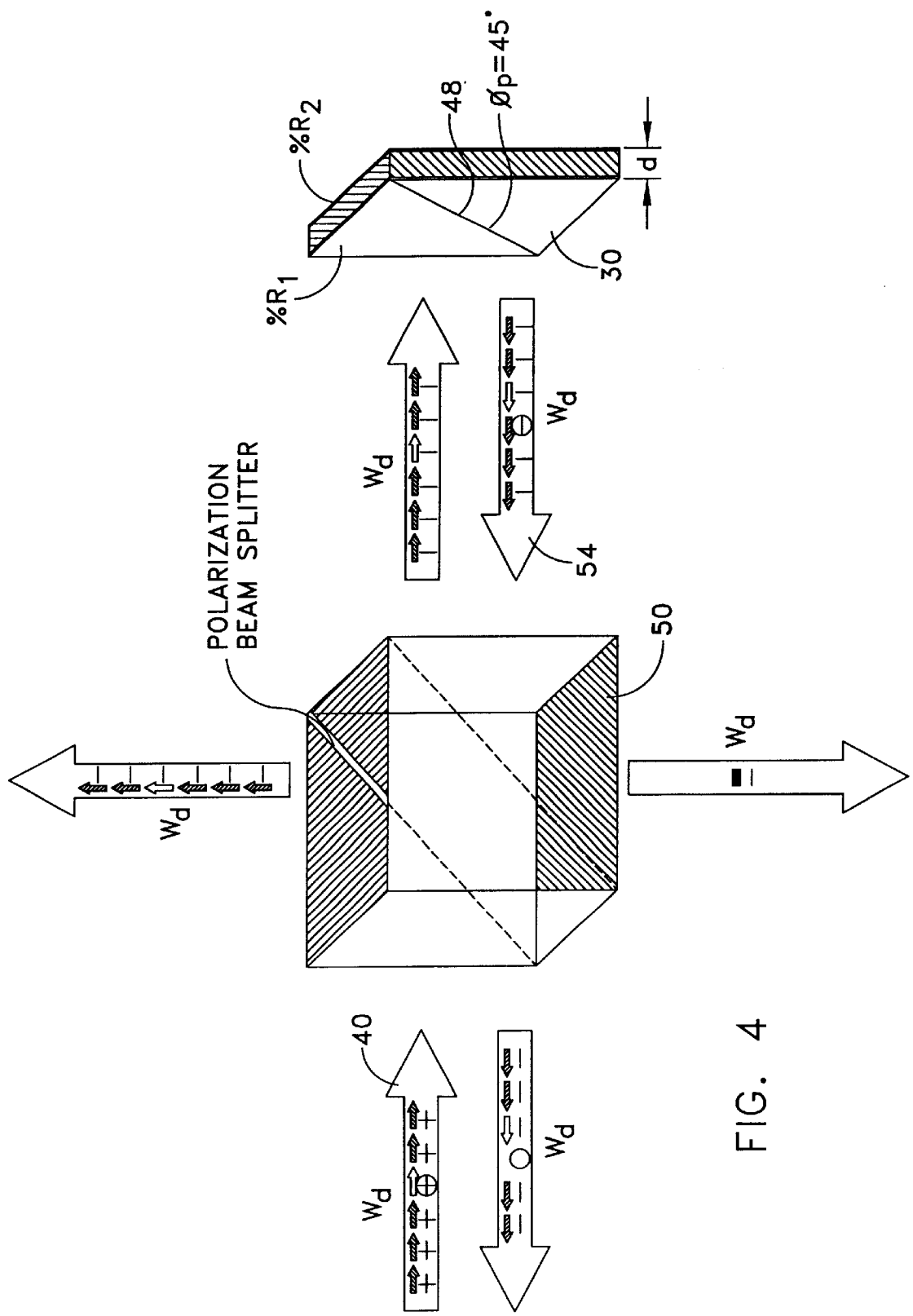
FIG. 4 is a schematic illustration further comprising a polarization beam splitter and illustrates an example of how the invention can be applied to selective separation of a given wavelength.

In addition to encoding wavelengths with different polarizations, the invention is useful in that the polarization change can encode information. That information is decodable as well. For example, it is possible to provide a polarization sensitive wavelength separating device as shown in FIG. 4, wherein structures such as those shown in FIGS. 2 and 3 are used in combination with appropriate polarization separating devices such as polarization beam splitters or polarization beam displacers. As an alternative, a polarization encoder device of this type can function as a polarization decoder device.

In FIG. 4, the input beam 40 is unpolarized (i.e., randomly polarized or otherwise having mutually perpendicular polarization components). This input beam 40 is separated by a polarization beam splitter 50, which separates the input beam 40 by diverting a component having one polarization orientation (e.g., horizontal) and passing to the Fabry-Perot 30 the component having the perpendicular orientation (vertical in this example). Thus all the wavelengths incident on the Fabry-Perot have the same polarization orientation. By action of the birefringent material in the cavity of the Fabry-Perot, the polarization orientation of the resonant wavelength $\omega_d$ is rotated.

The Fabry-Perot element behaves like a tunable half wave plate. That is, for the resonant wavelength $\omega_d$ the Fabry-Perot behaves like a half wave plate and for the non-resonant wavelengths the Fabry-Perot has no effect. The polarization beam splitter 50 diverts the resonant wavelength $\omega_d$ due to its polarization orientation and passes the remainder of the reflected beam, from which the resonant wavelength $\omega_d$ is wholly absent. Similar structures can be designed using other types of polarization separating devices. An example of another such structure is a calcite crystal. Furthermore, the resonant wavelength can be tuned using an electrically controllable device for the birefringent material between the reflectors on the surfaces of the Fabry-Perot element, such as a liquid crystal.

Typically, the cross sectional size of the incident light beam 40 on the device is smaller than the available size of the device. The beam cross section can be much smaller than the available area, if desired, which makes it possible to provide arrays of devices or arrays of beams that are similarly processed by one device as in FIG. 5. In the example shown in FIG. 5, an array 62 of input beams is provided in the form of parallel spaced incident beams along a line or an X-Y pattern. In such an embodiment, the incident beams of the array 62 can differ as to their content and can be processed in the same manner by the Fabry-Perot element 30 to produce an array of output beams 63, the operation being substantially the same as with one beam in FIG. 4.

In cases where there are plural beams and spaced plural points of incidence, however, the Fabry-Perot device 30 also can be subdivided and can comprise a corresponding array of independently tunable birefringent elements in a pixilated array 64. The birefringence (and the resulting optical path length) of the pixilated elements in the array can be determined by an electrical signal applied to each pixel of the array separately. This can be done in a one or two dimensional array, a two dimensional array being shown in FIG. 5.

Where plural points of incidence are provided, it is also possible to design the individual devices of the array to have different physical properties of a type that are fixed rather than tuned. For example, the individual subdivided paths where the beams are incident (which may be called pixels of the array) can have different mirror reflectivities. They can have distinct controllable or fixed gaps between the reflectors, which affects tuning or at least determines the basic path length obtained in the absence of electrical excitation. In some applications it may be desirable to have a variation of properties in one device. In that case, the discrete segmentation might be replaced by a continuous gradient of these and similar properties.

Figure 5:
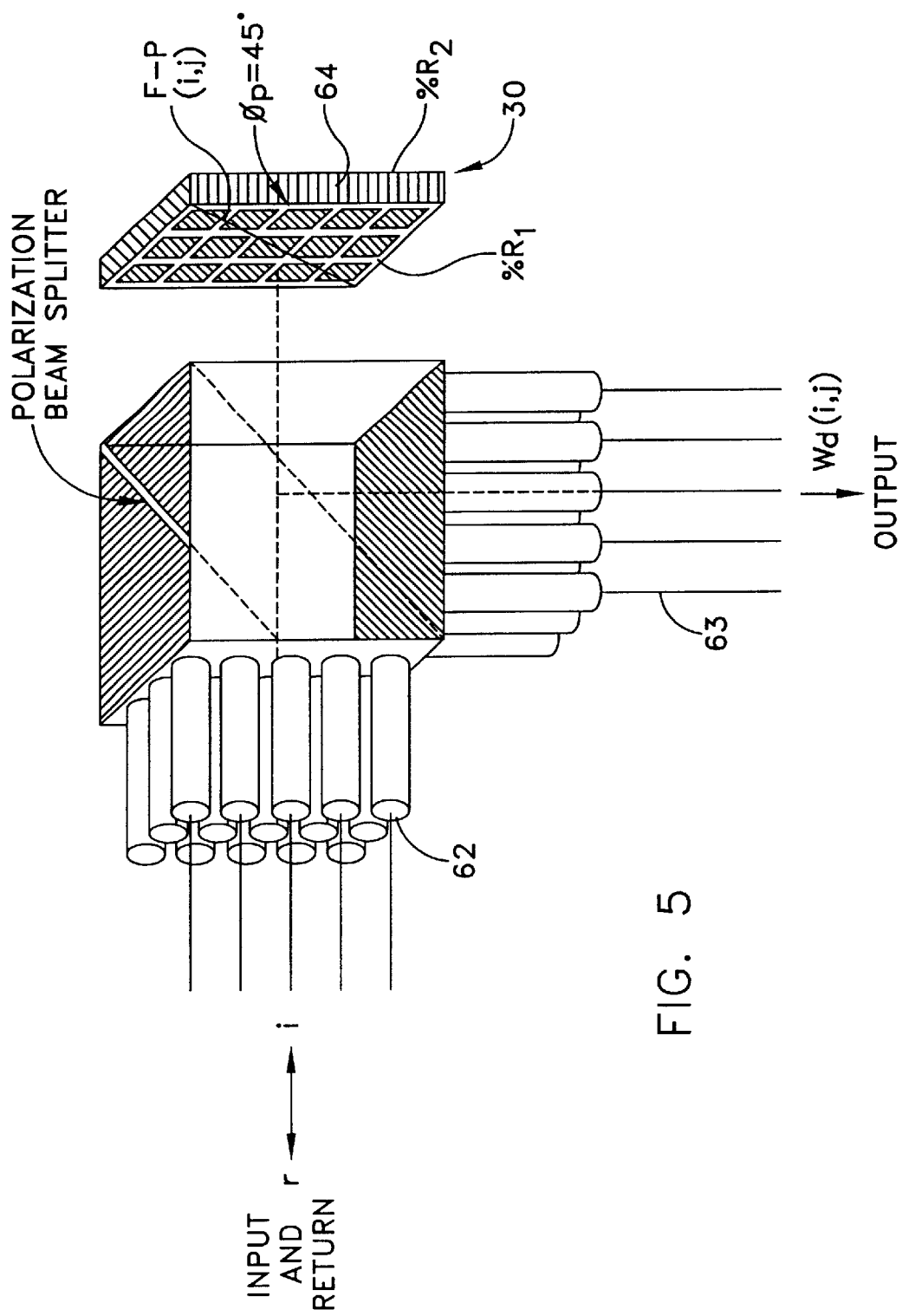
FIG. 5 is a schematic illustration of the invention according to FIG. 4, operating simultaneously on an X-Y array of laterally spaced beams that are subdivided in the manner of discrete pixel areas.

The structures shown in FIGS. 4 and 5 are sensitive to the polarization of the incident beam(s). In many applications, especially including fiber optic applications, polarization dependence may be undesirable. A polarization insensitive structure is preferable. According to an inventive aspect, the apparatus and method of the present invention can provide a polarization insensitive wavelength dependent device, using a polarization diversity arrangement. A number of different configurations are possible, which will become apparent to those skilled in the art in view of the following exemplary devices, which particularly employ calcite beam displacers and polarizing beam splitters. For simplicity, the examples are discussed with reference to single input beams, but should be understood that the invention is also applicable to multiple beam arrays. The general idea is to filter or separate components by polarization, transform one to correspond to the other, and recombine the polarization components so that an original input beam with diverse polarization conditions is replaced by a modified input beam having a known polarization orientation relative to the Fabry-Perot.

Figure 6:
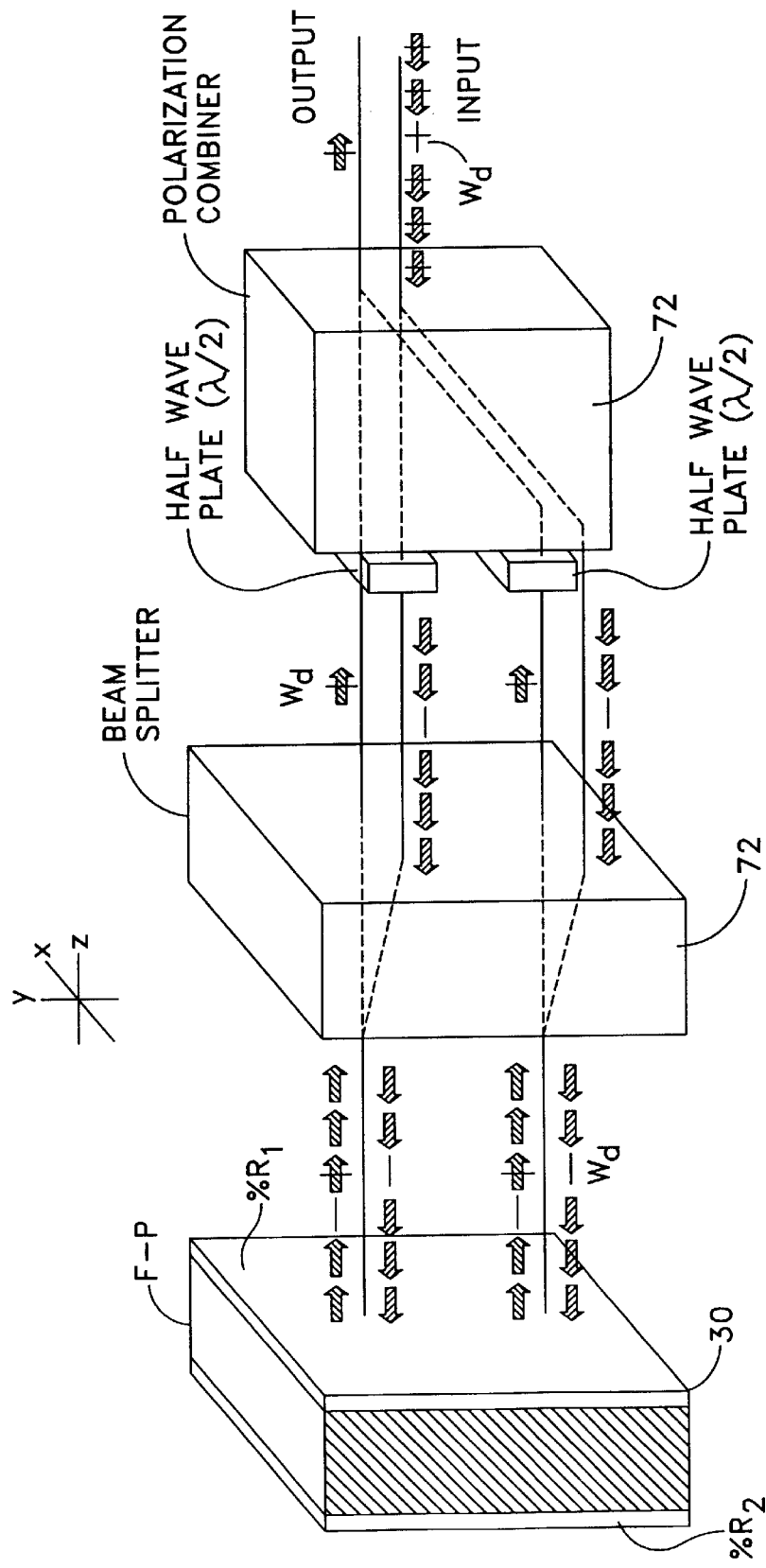
FIG. 6 is a schematic illustration of an application of the invention to encoding a selected wavelength and including a beam displacing crystal.
Figure 7:
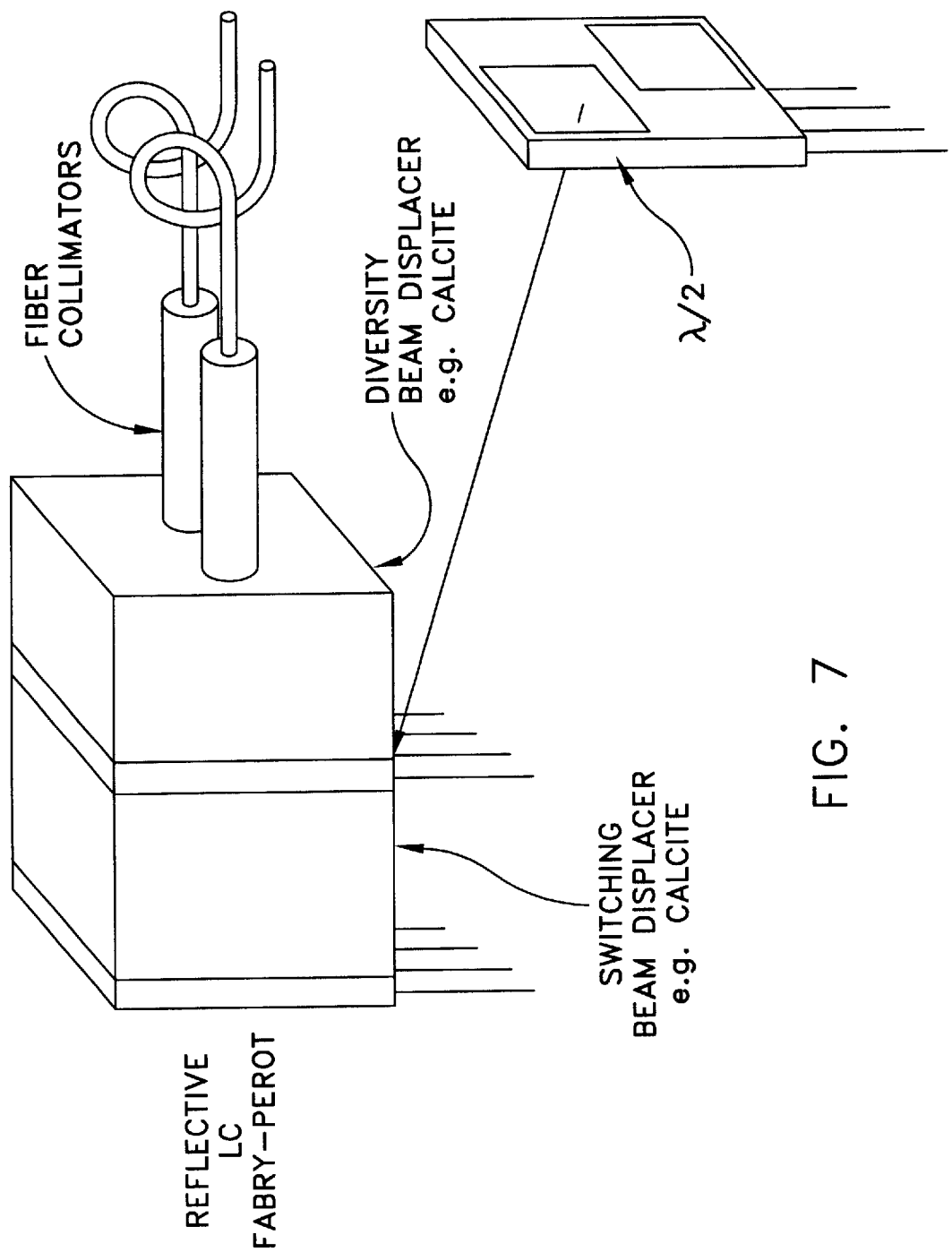
FIG. 7 is a schematic illustration of a stacked configuration for a packaged device according to the invention, including a polarization independent reflective encoder and phase plates coupled to optical fibers.

FIG. 6 illustrates an embodiment using two sets of beam displacement crystals such as calcite. A structure as shown provides a polarization insensitive device in which the selected wavelength (the resonant wavelength) is deflected to the output port, while the unselected wavelength gets reflected back into the input port. The reflected light can be tapped out by using a circulator at the input end. Alternatively, the unselected wavelengths that are reflected may be diverted into another port or otherwise handled. FIG. 7 shows the device that appears in exploded view in FIG. 6, as it might appear as a packaged element in an optical signal processing apparatus. In particular, the respective elements of the device are mounted directly to one another and electrical control leads are conveniently oriented for mounting on a printed circuit card, etc.

Figure 8A:
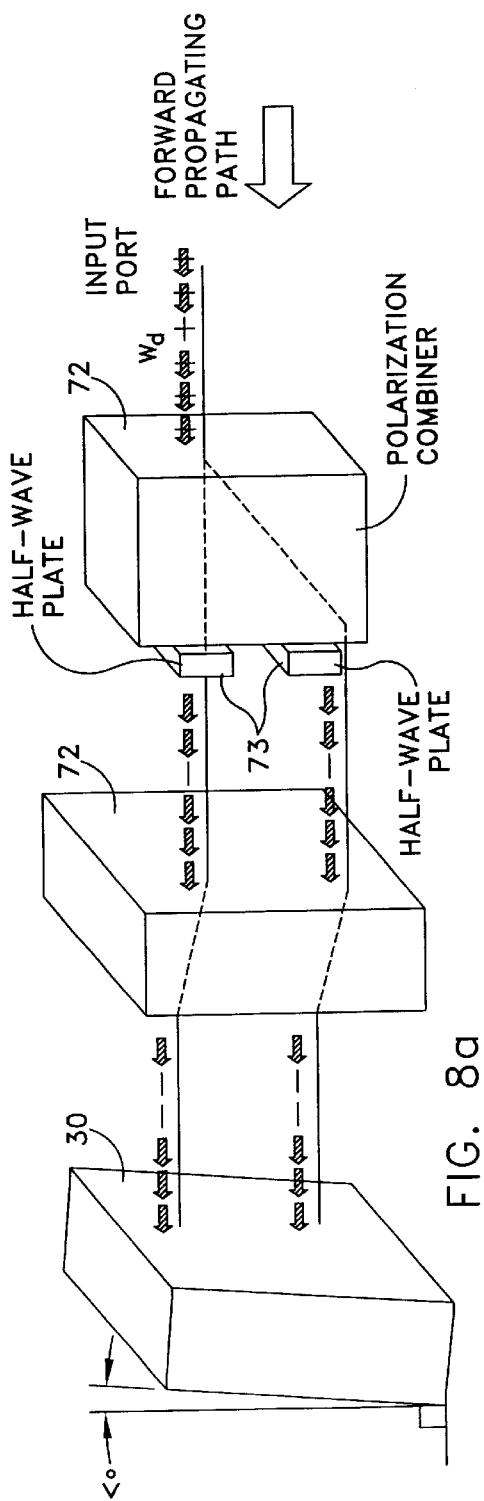
FIGS. 8a and 8b separately illustrate the forward and reflected paths of a beam in a polarization diversity structure for a reflective Fabry-Perot according to the invention with polarization-wavelength encoding.
Figure 8B:
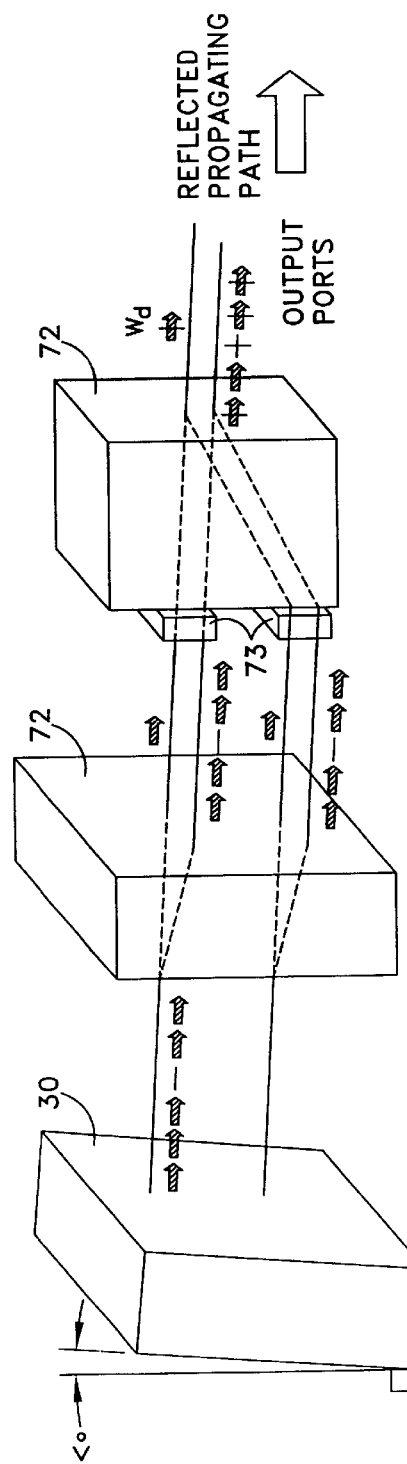

In the example of FIGS. 8a and 8b, which respectively show the paths of the input and reflected beams, the unselected wavelengths are rejected by slightly tilting the reflective Fabry-Perot element 30 such that the incident and reflected beams do not directly overlap. A tilt for this purpose can be in the direction shown, orthogonal direction to that shown or at some other angle that has the effect of directing the selected wavelength along a particular path and the unselected wavelength along a different path.

Figure 9:
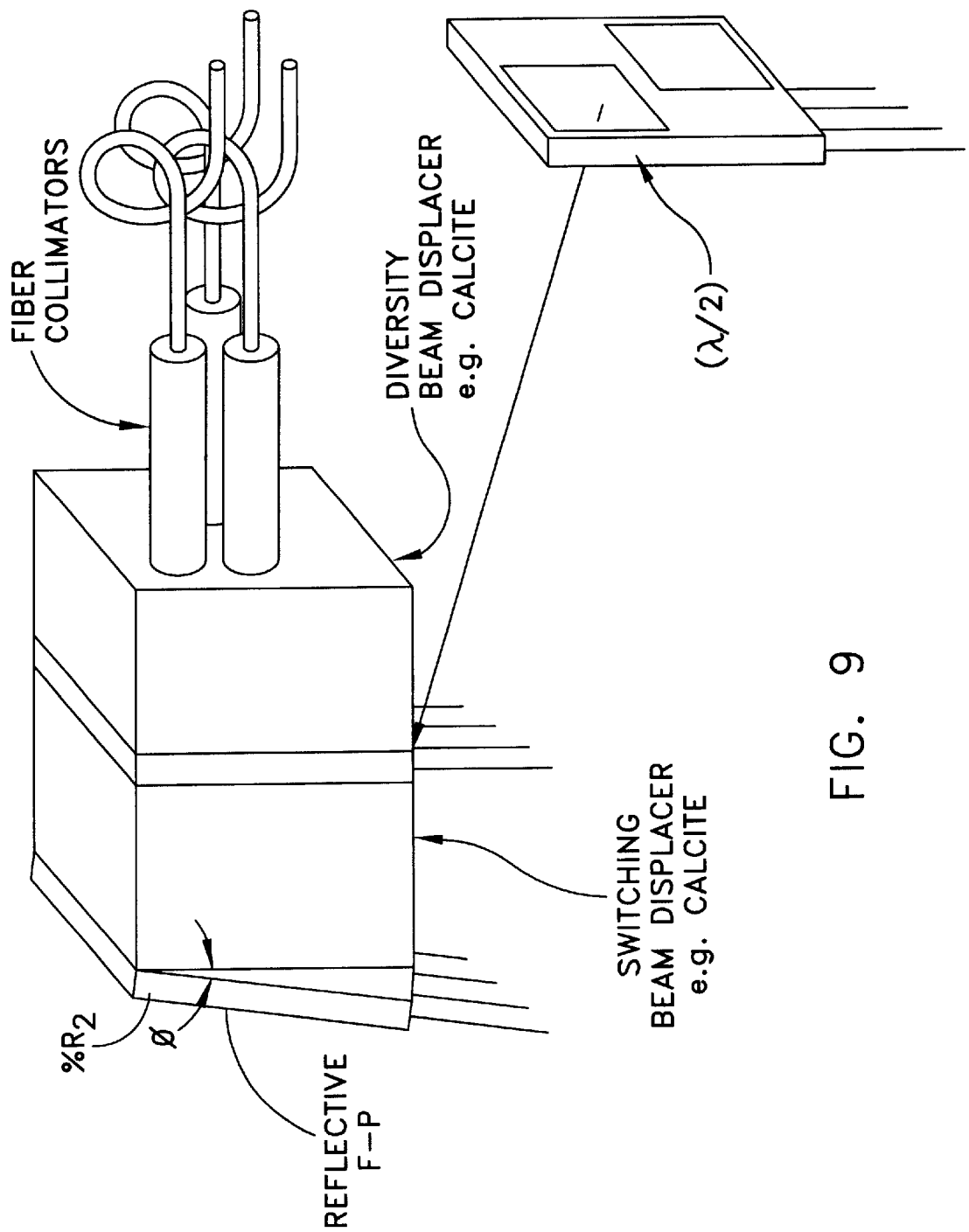
FIG. 9 is a schematic illustration of an opto-electronic package corresponding to the exploded view of FIGS. 8a, 8b.

FIG. 9 shows the configuration or layout used in FIGS. 8a, 8b, in a stacked form characteristic of a packaged device or element, for example to be employed in an optical communication system, as FIG. 7 shows a packaged configuration corresponding to FIG. 6. These figures also illustrate application of the invention to subdivided or pixilated beams of light, such as incident beams from discrete fiber collimators that are arranged to impinge on discrete controllable crystal device segments provided for the individual pixels. Thus, a simple four pixel device of appropriate size would allow simple stacked structures as shown in the FIGS. 7 and 9. In FIG. 9, a pixilated half wave plate is used adjacent to a single beam displacement crystal (e.g., calcite). This is but an example, and it should be apparent that the same result could be obtained by other functionally similar arrangements. As another example, two or more adjacent crystals could be used instead of a pixilated half wave plate and one crystal, effectively achieving a similar result.

Figure 10:
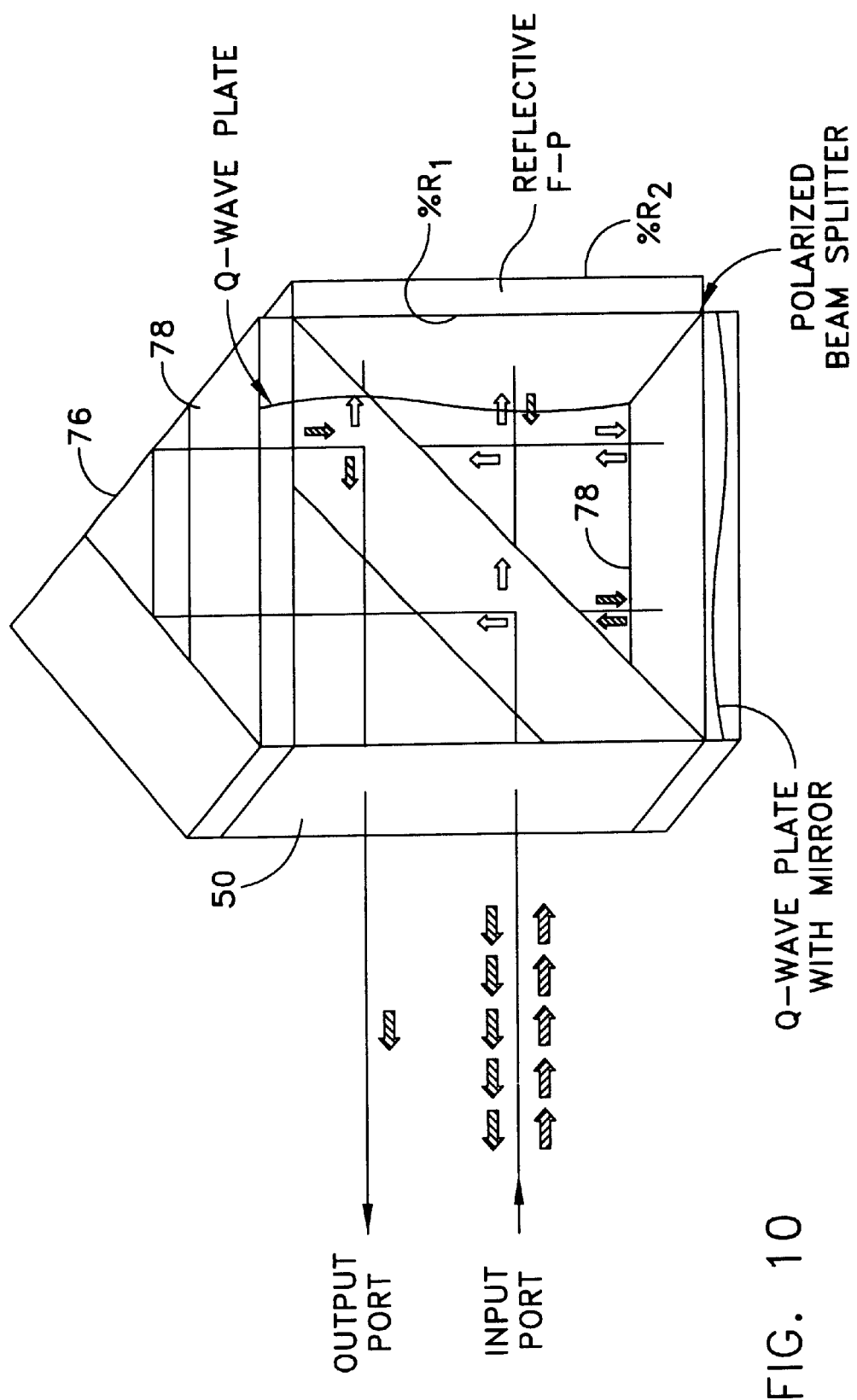
FIG. 10 illustrates a polarization independent reflective encoder using beam splitters and phase plates.

FIG. 10 shows an example of a functionally similar but geometrically different structure using polarizing beam splitters. FIG. 10 is one example of how to make a tunable polarization insensitive device which is functionally similar to the device shown in FIG. 6, namely in which the unselected wavelengths get reflected back to the input port. By tilting the reflective Fabry-Perot, it is possible to collect all reflected light into different ports, similar to the one shown in FIG. 8. The operation of the device in FIG. 10 is similar to the foregoing devices, except that the light is collected and recombined using certain passes through the polarization beam splitter 50, a prism with internal reflectors 76 and two q-wave plates 78. The results are equivalent in that the selected wavelength $\omega_d$ is routed to an output port that is physically separated from the input port, and the wavelengths apart from $\omega_d$ are reflected back along the input path.

Figure 11:
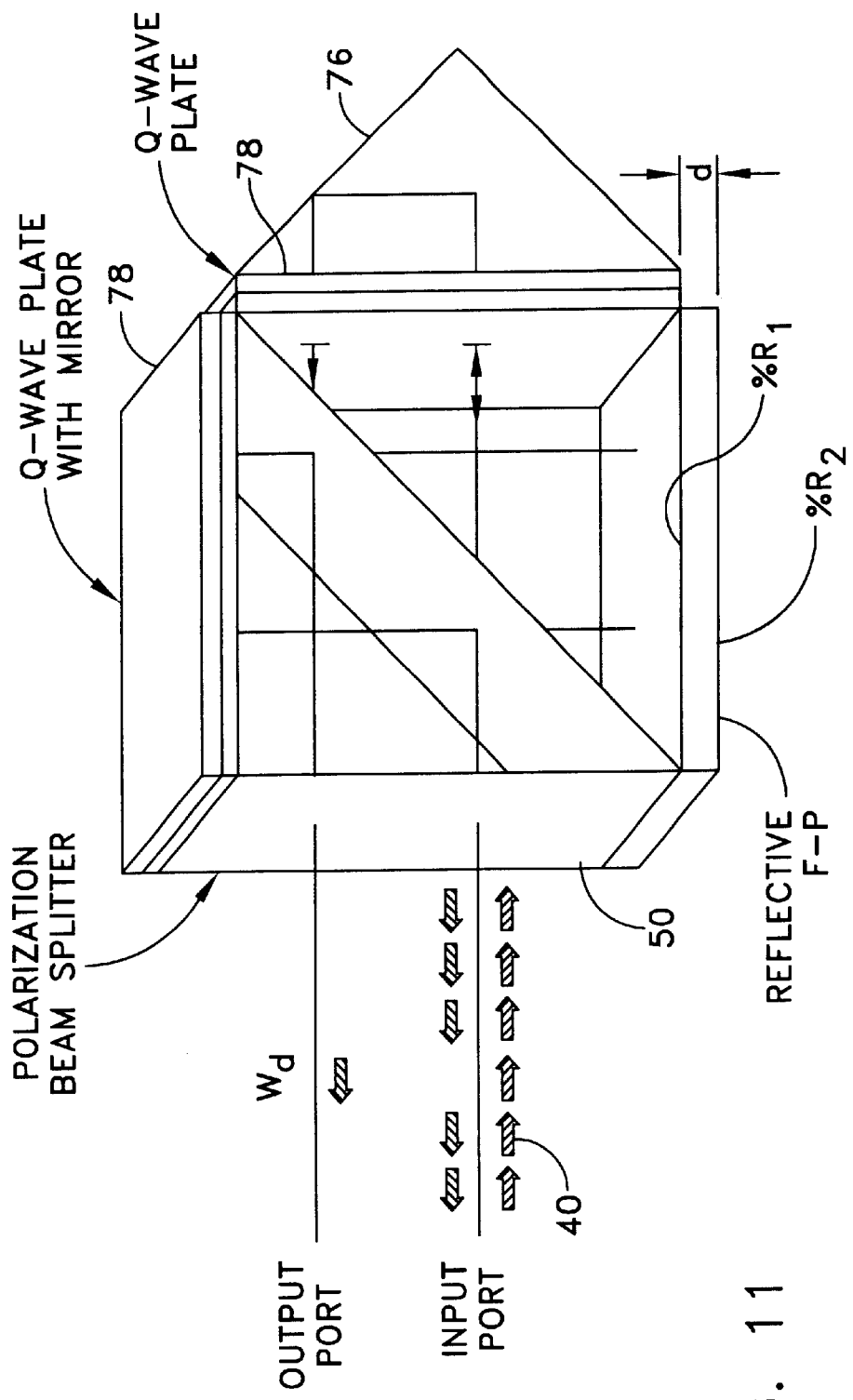
FIG. 11 illustrates an embodiment that is functionally similar to FIG. 10 but has a different geometry.

An alternative functionally similar embodiment is shown in FIG. 11. This embodiment is characterized by a reduced polarization dependent path difference. FIGS. 10 and 11 essentially show that the selected wavelength $\omega_d$, through polarization encoding is discriminated and directed to an output port. By making the quarter-wave plate tunable between zero birefringence (or an integer multiple of $2\pi$) and effective quarter-wave retardation, the output can be is switched. In effect, the device is thus switched controllably between operation as a wavelength band pass filter and operation as a notch filter, passing either the selected band on the one hand, or all but the selected band on the other hand. In this way the invention can operate as a bandpass or notch filter. The discussion of simulation results below also provided for certain intermediate effects between a notch filter and band pass filter, which can be accomplished by changing the value of the retardation plate. Additionally, it is possible to produce polarization rotation at the output by incorporating additional wave plates in the path.

A Fabry-Perot device generally is limited to selecting one wavelength at a time, or at most a series of wavelengths that are related, such as wavelengths that when added in integer multiples of one or more are equal to the distance between the Fabry-Perot reflectors 32, 34. The specific wavelength $\omega_d$ may be tunable, using an electric signal to vary the optical path on one axis of birefringence, but the device at least on that axis, can only be tuned to one wavelength $\omega_d$ at a time. This limitation can be overcome as demonstrated by FIGS. 12a and 12b, wherein a plurality of independently tunable Fabry-Perots are coupled successively in cascade. According to another inventive aspect as thereby shown, multiple wavelengths propagating along the same path can be selected and selectively processed (polarized, diverted, etc.) by using more than one reflective Fabry-Perot structure according to the invention, tuned to the same or different values of $\omega_d$ (i.e., $\omega_{d1}$, $\omega_{d2}$, $\omega_{d3}$, etc.).

Figure 12A:
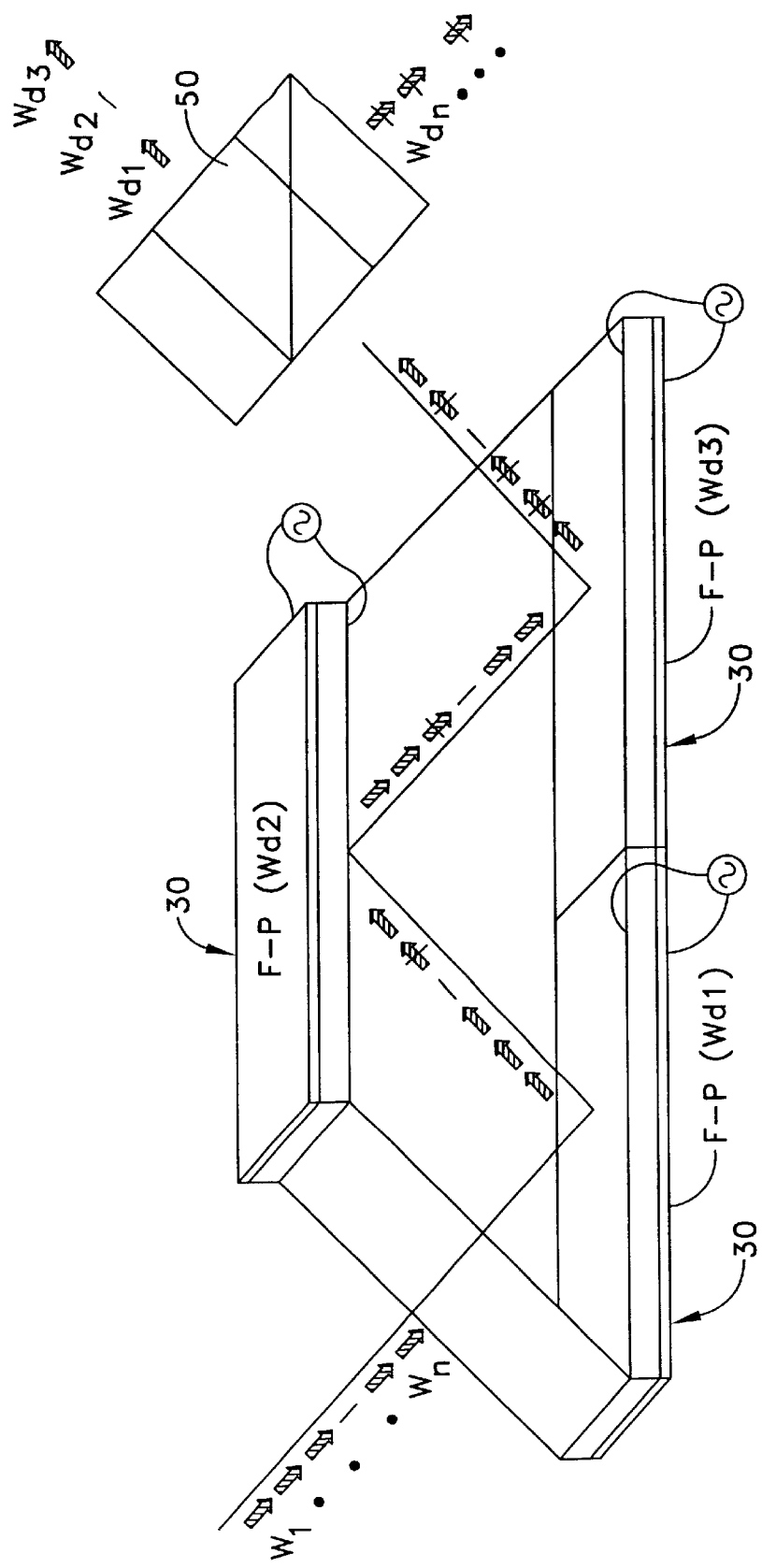
FIGS. 12a and 12b illustrate two embodiments having cascaded reflective Fabry-Perots for serial or sequential selection of selected wavelengths tuned or controlled by the cascaded Fabry-Perot elements individually.
Figure 12B:
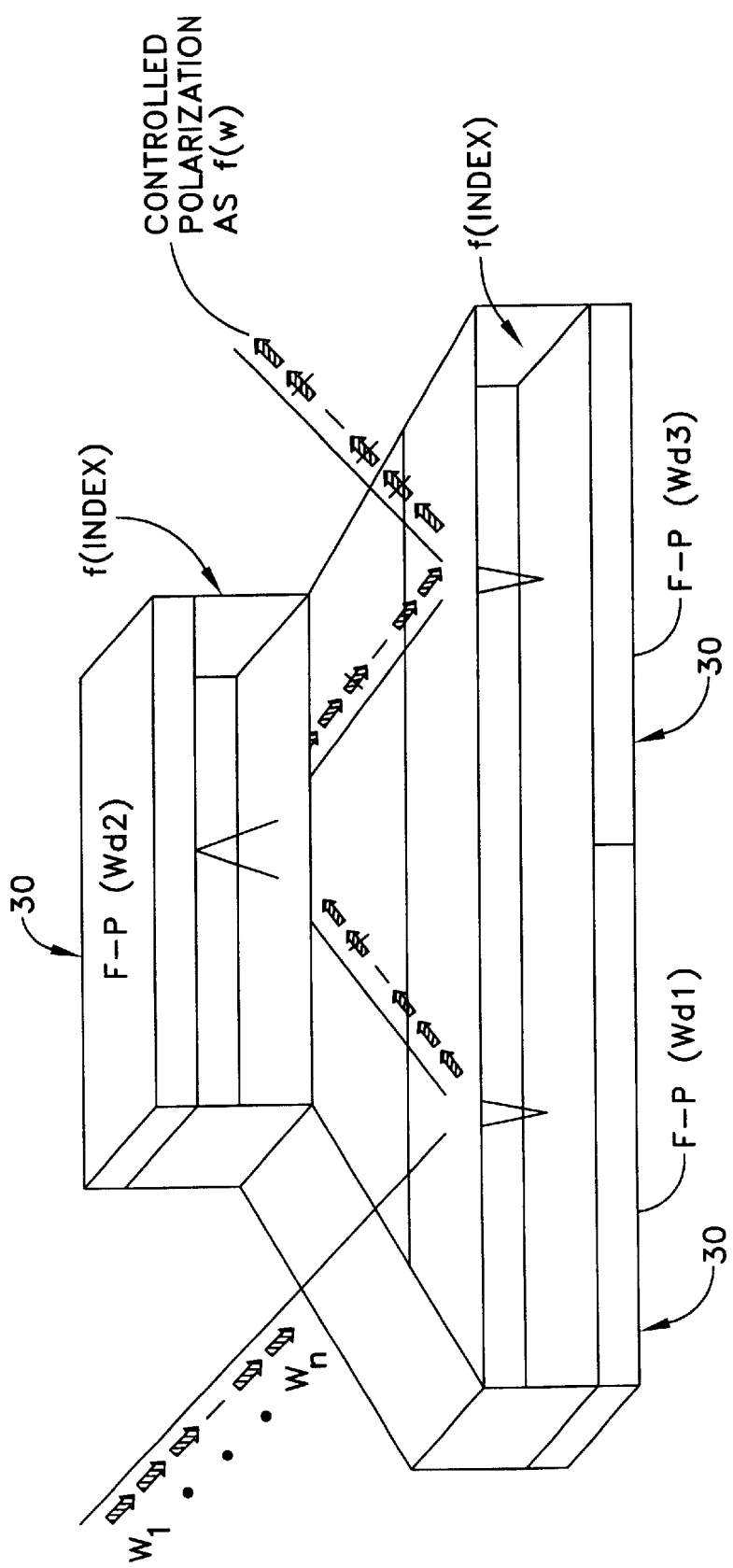

In the examples shown in FIGS. 12a and 12b, the independently tunable Fabry-Perots 30 are encountered on opposite faces along a zigzag reflective path. Each Fabry-Perot alters the polarization of a single wavelength to which it is tuned. The multiple wavelengths are separated in FIG. 12a at the end of the illustrated section of beam path, using a polarization decoder such as a beam splitter 50. The device can be polarization sensitive or can be made polarization insensitive by using diversity schemes such as those discussed above. In FIG. 12b the output simply contains a plurality of wavelengths wherein some are marked by distinct polarization.

In the examples shown in FIGS. 12a, 12b, the angle of incidence/reflection is not exactly normal to the plane of the Fabry-Perot. The angle of incidence of the beam onto the reflectors of the reflective Fabry-Perot shown in FIG. 12 has been exaggerated for illustration purposes. The actual angle preferably is kept very small to avoid problems such as beam walk-off. It is possible to arrange the optical layout to make the angle of incidence onto the Fabry-Perot almost normal. In FIG. 12b, refraction is used to adjust the angle of incidence/reflection more nearly toward normal.

The embodiments of FIGS. 12a and 12b are advantageous in that it is made possible to make a one by two wavelength router in which selected wavelengths from the incident beam can be routed controllably to either of two output ports. This is accomplished by selectively activating the Fabry-Perot element or elements corresponding to one or more particular desired wavelengths to be routed by polarization encoding. The polarization encoding is accomplished by electrically activating the birefringent material (e.g., liquid crystal) of the Fabry-Perot for a given wavelength, thereby modifying the polarization of that wavelength without disturbing the other wavelengths.

Figure 13A:
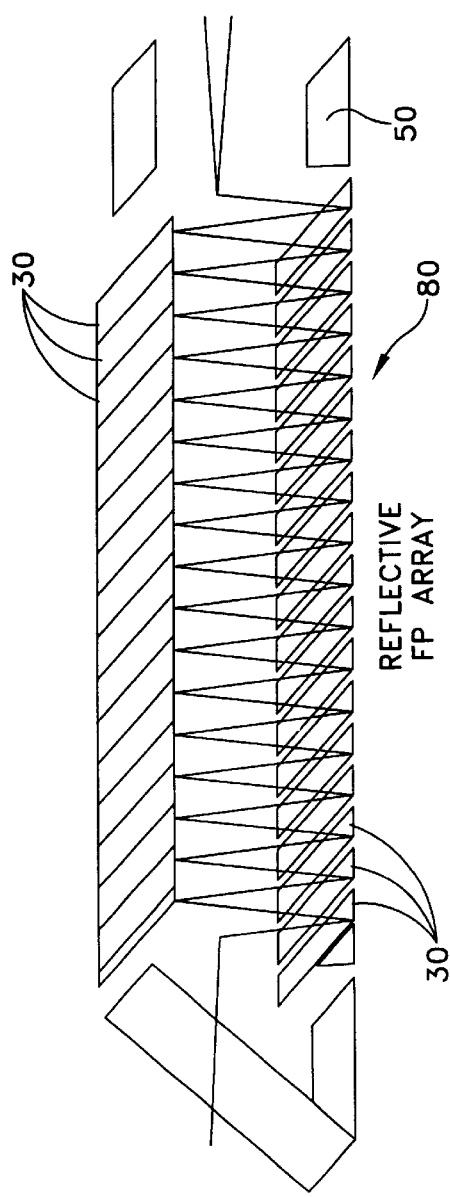
FIG. 13a and 13b illustrate functional an physical aspects of a cascaded wavelength selective device that is controllable for selective routing of wavelengths to either of two output ports.
Figure 13B:
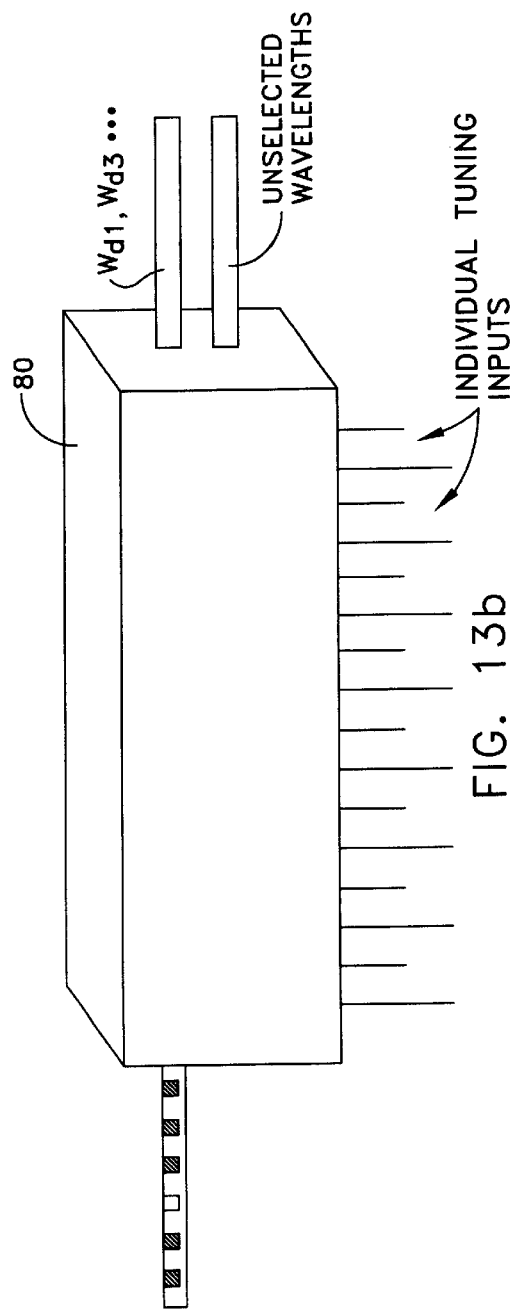

Any number of successive Fabry-Perots is possible as the beam passes back and forth, and each is tunable. An exemplary packaged device 80 of this type could be arranged as shown in FIGS. 13a, 13b. FIG. 13a shows the beam path and output stage. FIG. 13b shows the external package including the electrical leads provided for selecting the resonant wavelength of the separately tunable elements.

The polarization decoder or separator 50 at the end of the path (such as a Wollaston Prism or polarization beam splitter) selectively routes the wavelengths onto one path or another depending on their polarization. The polarization of each respective wavelength for which a Fabry-Perot element 30 is tuned is thereby selectively set, and later used for discriminating, routing, encoding/decoding or similarly handling the beam is a manner specific to the respective wavelengths. This has various uses for encoding information, addressing, etc. Yet the device can be compact and functional for plural wavelengths, each of which encodes separately encodes a datum by virtue of its polarization. According to the invention, this is accomplished by making Fabry-Perot elements in the form of arrays, patterning electrodes for the arrays such that the electric fields applied to each element controls the effective birefringence of the element, and employing the device to alter the polarization of selected wavelengths to encode and decode particular wavelengths with whatever information may be desirable.

Up to this point, the discussion and examples have focused on illustrative physical examples of devices and optical layouts that are useful as applications for operating a Fabry-Perot in a reflective mode together with elements that selectively operate on either the selected (resonant) or unselected wavelengths, such as a birefringent element between the Fabry-Perot reflectors that operates on the resonant wavelength only. These examples are intended as exemplary and nonlimiting. Other specific structures are possible and will now be apparent to those skilled in the art in view of this explanation and the illustrated examples.

It is an aspect of the invention that the polarization change employed to mark selected wavelengths can be selectively applied by tuning the applicable Fabry-Perot to a given wavelength. At least a portion of the Fabry-Perot cavity contains birefringent material and the birefringent material can be controllable, either to turn the effect on and off or to alter the wavelength that is affected. The encoding and decoding are preferably controllable (i.e., activated and deactivated at different times). An advantageous controllable birefringent material for this purpose is liquid crystal, and in particular nematic liquid crystal. Other materials also are possible.

A simple nematic liquid crystal cell can comprise two glass plates that are separated by a small gap and may be coated with a conductive material that can be coupled to a voltage signal source to apply an electric field to an alignment layer. Application of the electric field serves to align the liquid crystal molecules in a desired direction. The gap between the electrodes (e.g., conductively coated glass plates) can be filled with liquid crystal and then sealed to form a liquid crystal cell as is well known in the art.

A liquid crystal Fabry-Perot 30 has a similar structure a liquid crystal cell as described, except that the Fabry-Perot has two spaced reflectors 32, 34, located on opposite sides of the liquid crystal material. For providing the reflectors, the inner surfaces of the glass plates of a liquid crystal cell structure may be coated with appropriate optically reflective coatings (i.e., mirror or at least partly silvered coatings). The mirror coatings and the resonant space between them form the Fabry-Perot cavity. The liquid crystal in the cavity is birefringent under control of a signal applied to the liquid crystal electrodes.

In a birefringent material, the refractive indices along two orthogonal directions are often different. These materials may be anisotropic. When they are confined in a Fabry-Perot cavity, they effectively give rise to two resonances, generally at different wavelengths but potentially tunable to cross or coincide at the same wavelength.

It is known that asymmetric Fabry-Perot structures can be used to produce a phase shift. In particular, considering an idealized structure in which one of the mirrors is a perfect reflector while the other has a reflectivity of R, all the light falling on this structure gets reflected, although the light at the resonant wavelength experiences a $\pi$ phase shift.

With birefringent material in the cavity, there are two resonant wavelength values, one along the director axis and the other perpendicular to the director axis. If plane polarized light impinges on the structure at 45 degrees relative to the director axis, the electric field vector has components of equal magnitude along the director axis and perpendicular to the director axis. If the wavelength of the light is such that one of the components is resonant, then that component experiences a relative phase shift of n with respect to the perpendicular component, which is not resonant. This means that the input polarization of the light is rotated by $\pi/2$ upon reflection, if only one of the components is resonant.

More generally, if the radiation falling on the reflective birefringent Fabry-Perot is polychromatic but plane polarized, then only that wavelength component which is resonant with one of the cavity resonances will experience a polarization transformation. The rest of the wavelengths will experience no polarization rotation. More complex polarization rotation will be experienced depending on the angular relationship between the principal polarization axis direction and the direction of the fast axis of the birefringent material. This transformation can be calculated using Muller matrix calculations or Jones matrix calculations.

An inventive aspect of the reflective Fabry-Perot according to the invention, namely with an electrically alterable birefringent material in the cavity, is that the operable resonant wavelength $\omega_d$ can be tuned. This is accomplished by changing the effective birefringence of anisotropic material contained in the cavity. The birefringence can be changed conveniently when liquid crystals are used, because the orientation of the liquid crystal molecules can be changed by applying an electric field. The change in orientation in turn changes the optical path length in the cavity. The optical length of the path between the reflectors 32, 34, for polarized light at the applicable orientation, is thus changed as a function of the electrical input signal, electrically controlling the specific wavelength $\omega_d$ to which the Fabry-Perot is tuned.

For the case where the molecular orientation is parallel at both surfaces, the application of an electric field to the liquid crystal changes only one of the path lengths applicable to the mutually perpendicular polarization components of the input beam. The application of an electric field across the liquid crystal may cause a non-uniform re-orientation of the molecules across the thickness of the cell, but the total optical path length is nevertheless changed, and the total optical path determines the cavity resonance wavelength $\omega_d$.

The application of an electric field for tuning does not re-orient or change the direction of the slow axis or the fast axis of the birefringent medium. Thus it is possible to arrange polarization diversity or selective polarization orientations in a manner that remains at the relative orientations for which the device is designed. Only the path length along the fast axis is changed, as long as the liquid crystal structure is untwisted. For twisted nematic liquid crystals, the reflective Fabry-Perot still behaves like a linear waveplate for near resonant wavelengths, because the eigenmode of the Fabry-Perot is always linear. However, the situation is more complex. Such devices may have distinct advantages (i.e., other useful applications).

Thus, for the untwisted sample being discussed so far, light falling on such a structure which is linearly polarized at 45 degrees with respect to the rubbing axis (the slow axis), will experience a 90 degree rotation of the polarization due to the relative π phase shift, as long as the wavelength of the light is resonant with one of the cavity resonances.

The discussion above has applied substantially to Fabry-Perot etalons comprising paired mirrors around a birefringent cavity. It is possible to apply a number of the same inventive aspects to optical interferometers other than Fabry-Perot interferometers.

The structures described here can be used not only for polarization encoding of wavelengths by impinging the light at 45 degrees to the fast axis of the tunable birefringent element, but also for introducing wavelength dependent phase when the device is used so that the light impinges on the device with linear polarization axis at zero degrees with respect to the fast axis of the device. While the operation is polarization sensitive, which may be preferred in certain applications, the device can also be made polarization insensitive by using a diversity scheme. The introduction of phase variation as a function of wavelength is needed for a variety of applications to correct for dispersion compensation, especially in the area of optical communications.

An optical interferometer generally divides light into at least two beams, and the phase of at least one beam can be adjusted. When these beams are combined together, the difference in phase results in interference effect. In general, the phase difference is wavelength dependent, thus the interference effect can be used to select the wavelength to be transmissive or reflective, such as with a Fabry-Perot type interferometer, but also with other devices that function in a similar manner, such as a ring resonator interferometer.

If birefringent material is provided in the light path where the phase can be adjusted (i.e., linearly and/or circularly birefringent material), the phase difference is not only wavelength dependent, but also is polarization dependent. This describes the reflective Fabry-Perot elements described above, and also can be considered a general case according to the invention.

As to the resonant wavelength, only one polarization component is truly resonant, and only that component accumulates the additional phase delay. The orthogonal polarization component is not in fact resonant, even though it may be at the same wavelength as its orthogonal counterpart, and no additional phase is obtained for this not-in-fact-resonant component. Because of this phase difference between the two orthogonal polarization states, the optical interferometer behaves like a (linear and/or circular) waveplate. The type of the waveplate depends upon the characteristic polarization of the interferometer.

For a Fabry-Perot, the eigen polarization state is always linear. Therefore, the reflective birefringent Fabry-Perot always behaves like a linear birefringent waveplate. On the other hand, in a ring resonator interferometer, the characteristic polarization in general can be any polarization, not necessarily linear. As a result, a different sort of waveplate function results.

EXAMPLES

Several reflective Fabry-Perot resonator devices were constructed as discussed herein as examples using commercially available E7 nematic liquid crystal in a resonant cavity between dielectric mirrors in the infrared region and gold coated surfaces as the "complete" reflectors or at least as high reflectivity dielectric mirrors. These devices were tested. In addition the devices were modeled mathematically and a program simulating results obtained with variation of the variables was prepared and compared to the experimental results.

In one example for which certain measurements are shown in the drawings, the mirror reflectivity was chosen to be 90% for the initial mirror 32 and about 99% for the second mirror 34. The mirror coatings were deposited on top of a conductive indium-tin-oxide coating, coupled to electrodes for applying the electric field across the liquid crystal. On top of the mirror coatings, a thin layer of polymer alignment coating was deposited, using standard spinning techniques, to promote liquid crystal alignment. The samples were rubbed or buffed in a chosen direction and assembled into a cell using precision fiber spacers for controlling the gap of the cell at a nominal gap of 10 microns. Care was taken to ensure that the rubbing direction on the two surfaces were as parallel as possible, including rubbing in opposite directions (parallel and anti-parallel) to prevent pre-tilt and so as to minimize any optical mode mixing due to deviation. The devices were tested at ambient room temperature.

An experimental setup with a polarization beam splitter 50 similar to the setup shown in FIG. 4 was employed for measurement purposes. The input light was delivered through a fiber graded index rod lens and the output lens was collected through a similar lens. The input light was passed through the polarizing beam splitter 50, which served both as a method of polarizing the input light and also as a method of deflecting the resonant reflected light for amplitude measurement. The optic axis of the liquid crystal was aligned at 45 degrees to the input polarization. For purposes of demonstration, a multimode fiber was used. The input light was provided by a broad band light emitting diode and the deflected light was monitored using a spectrum analyzer. A voltage signal was applied across the liquid crystal was a 10 kHz square wave with amplitude varying from 0 to 10 V rms provided by a programmable waveform generator.

Figure 14:
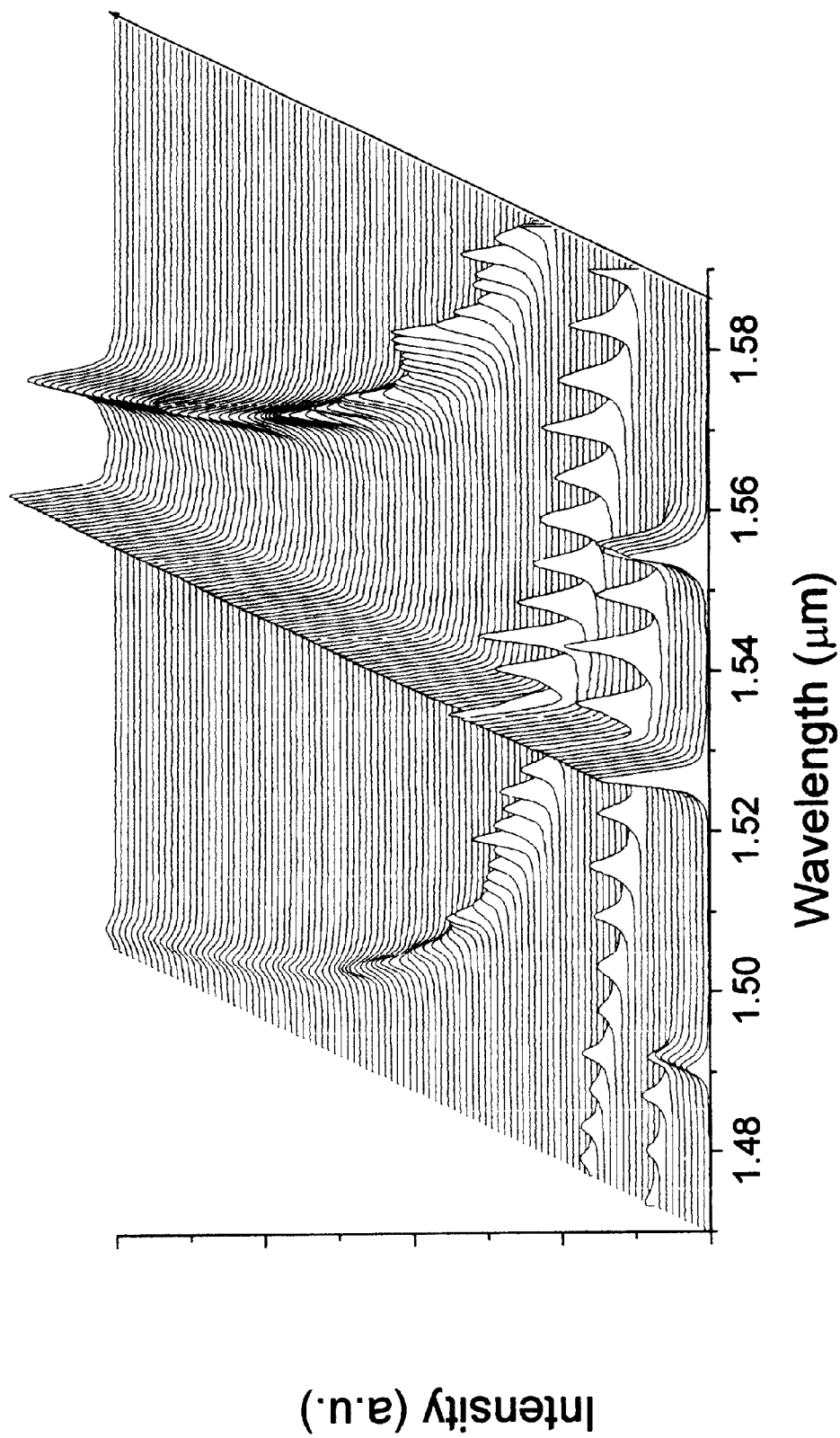
FIGS. 14 through 16 are graphic illustrations of reflective spectra of a Fabry-Perot according to the invention, demonstrating tunability and other aspects that are discussed below.
Figure 15:
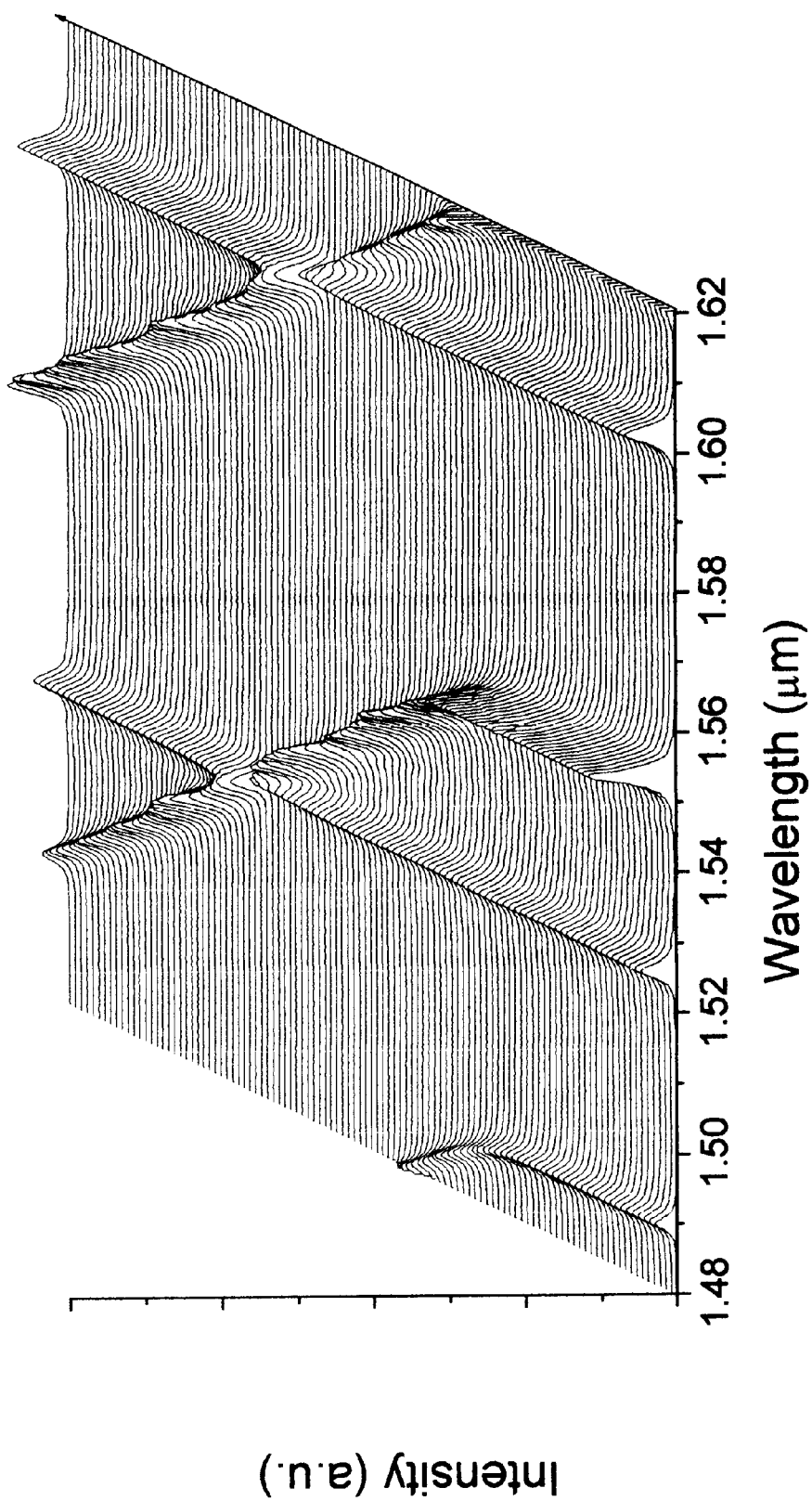
Figure 16:
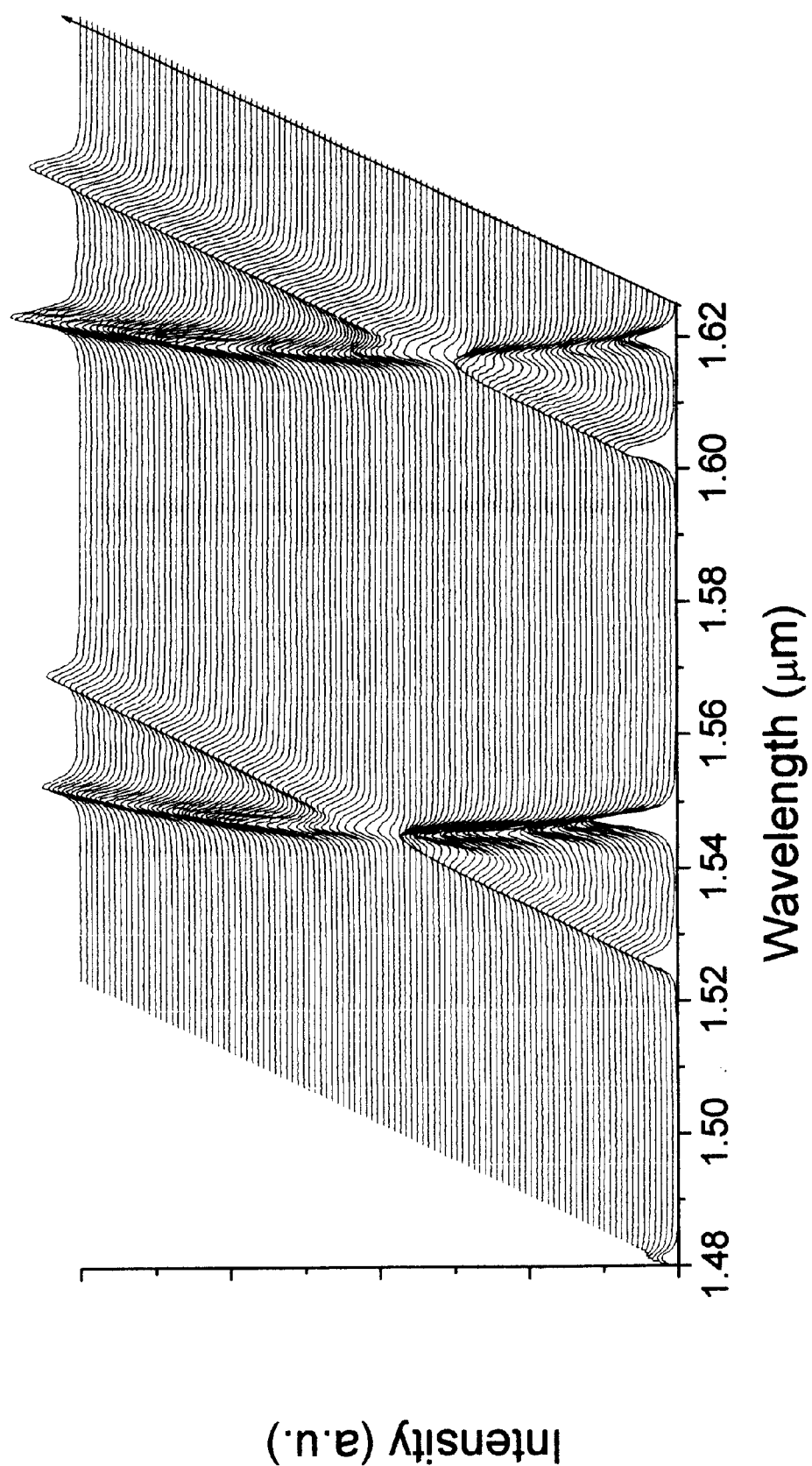

The results of the measurements are shown in FIGS. 14–16. In the figures the lowest scan is at zero field and the maximum is at a control voltage of 10 V. At relatively lower voltages, for polychromatic light falling on the structure, one observes two sets of resonances. None of these resonances changes below a certain voltage, called the Freiedrick's voltage, which is evident in FIGS. 14 and 15. This is because there is no molecular re-orientation below this threshold voltage. Above this voltage, one of the resonances changes with the applied electric field. With further increase in the applied voltages the two cavity resonances approach each other and the traces show a limit function behavior wherein the two cavity resonances would coincide at infinite voltage.

Higher modes are also observed, which can be eliminated by choosing the appropriate values of the birefringence and the thickness of the cavity as discussed below. The higher modes are clearly evident near zero volts applied voltage intensity, corresponding to the lowest scans in the FIG. 14, where the resonance at about 1.526 microns is due to the short axis and the other two are for the long axis with one being the higher order mode.

The modes can overlap, which is seen clearly in FIGS. 15 and 16, corresponding to the first and second crossing. When the modes overlap at a particular wavelength, the device effectively is polarization insensitive. The effective birefringence disappears and so does the polarization rotation mechanism due to the differential a phase shift otherwise provided only to one of the components. Both components are affected or unaffected equally.

The disappearance of effective birefringence at the crossings is comparable in FIGS. 15 and 16. Because of the stepwise change of the voltage (in steps of 5 mV), the tests did not contain an iteration in which the voltage was exactly equal to the amplitude that would result in complete extinction of birefringence. However it is clear that at a precise value of the voltage, the reflected signal vanishes, which is to be reasonably expected.

Figures 17, 18:
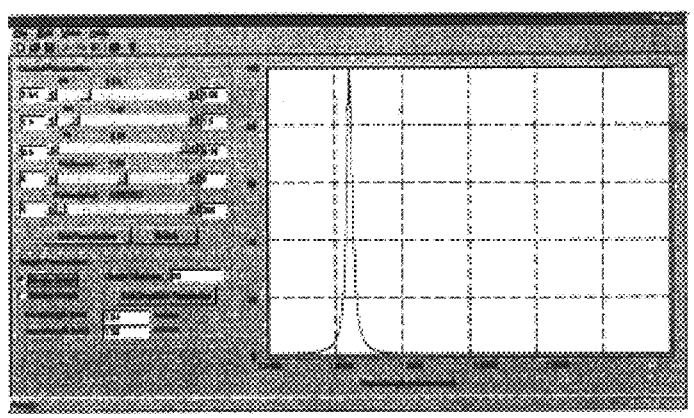
FIG. 17 is a graphic illustration of the user interface of a simulator program developed to demonstrate the invention, representative outputs being shown also in FIG. 18.

Having experimentally demonstrated the invention, a software simulation was prepared to simulate the performance of the device as demonstrated and to examine operation in the vicinity of the mode crossover. FIG. 17 shows an example of the operator interface permitting selection of values and showing the graphic display output, of the device.

The simulator allows the following parameters to be changed and the results plotted:

1. Wavelength range
2. Slow index value
3. Fast index value
4. Reflectivity of the mirror
5. Sample thickness The capability of display of multiple graphs was provided, permitting presentation of a series of plots as the value of the fast index is changed in N steps. (Activated by selecting the "series graph" option on the operator interface).

The display also is arranged to plot the results of retardation of the birefringent plate at 45 degrees with respect to the fast axis of the birefringent material in the Fabry-Perot. This function allows the output to be inverted if so desired, by switching between retardation values that differ by $\pi$ for the double pass. This function is selected using the "switch" option. The switch option is useful to evaluate the performance of non-ideal wave plates in a notch filter, and to obtain different shapes for the wavelength transfer function. The three examples in FIG. 18 show the graphic results of some exemplary simulations, the parameters of which are shown on the operator interface.

Figure 19A:
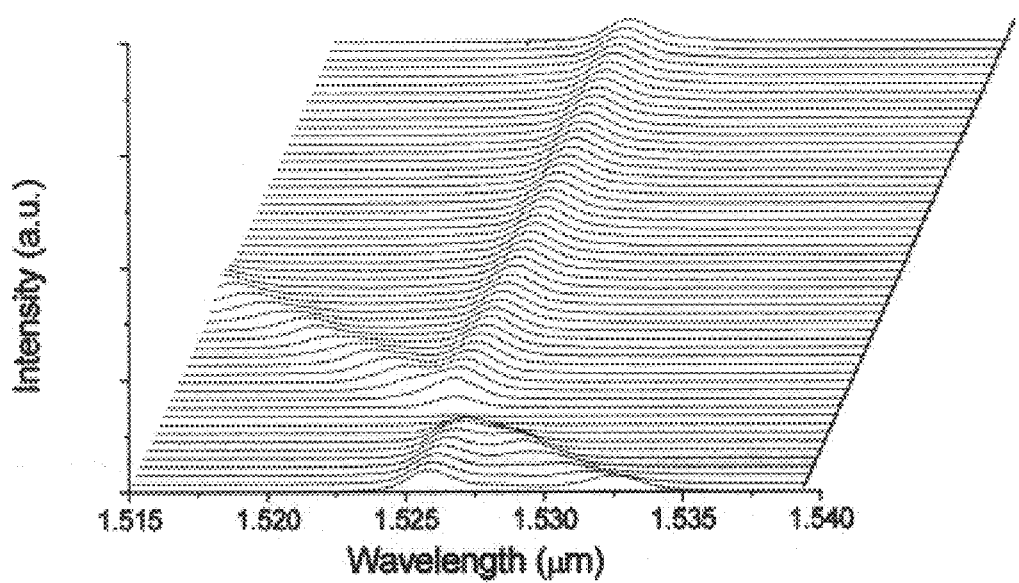
FIGS. 19a, 19b and 20a, 20b compare simulator presentations and spectral measurement data respectively showing the area of convergence of the resonant wavelengths at controlled and static axes of a liquid crystal controllable birefringent material.
Figure 19B:
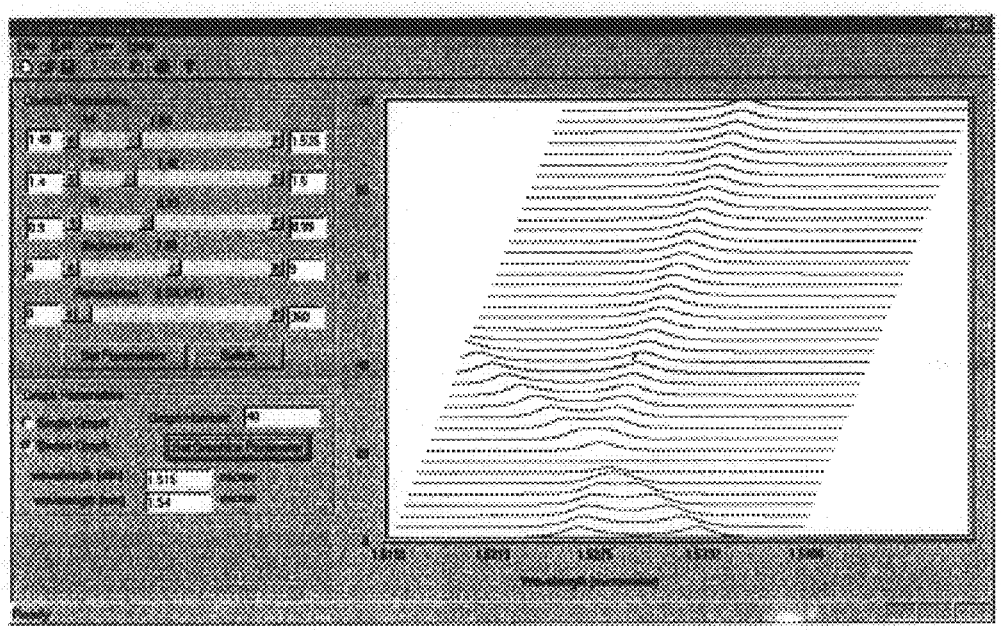
Figure 20A:
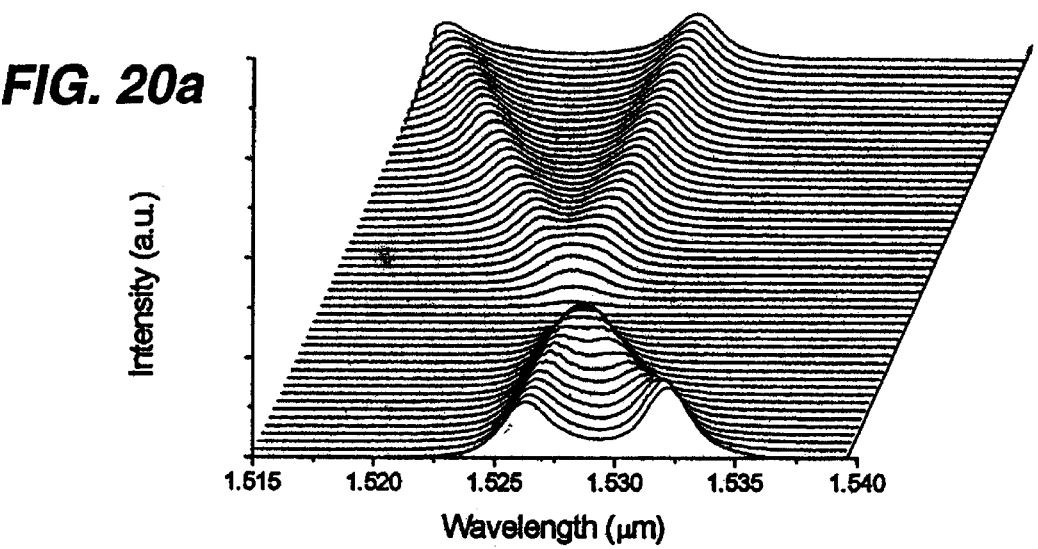
Figure 20B:
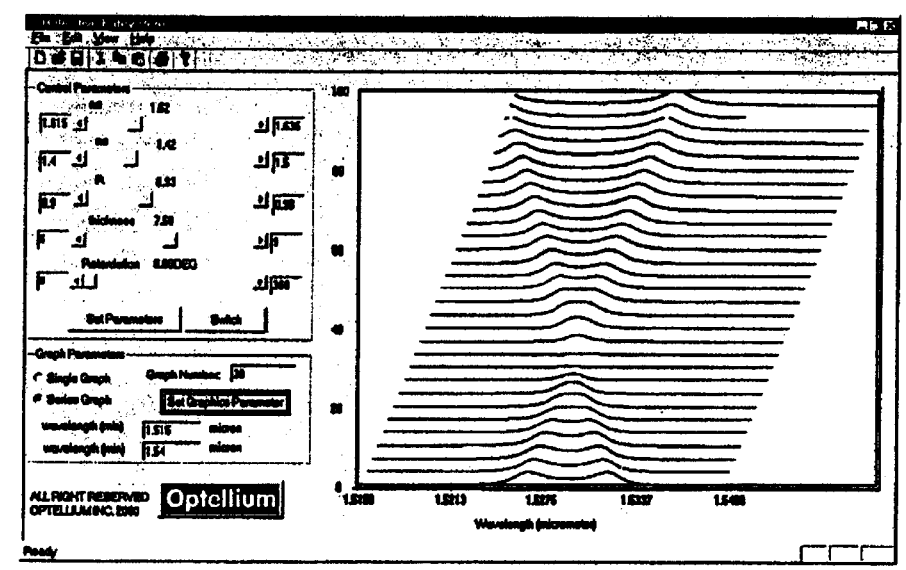

FIGS. 19a and b and 20a and b show the area of the first and second crossings using experimental and simulator calculation forms of output. These appear to correspond closely.

Figure 21A:
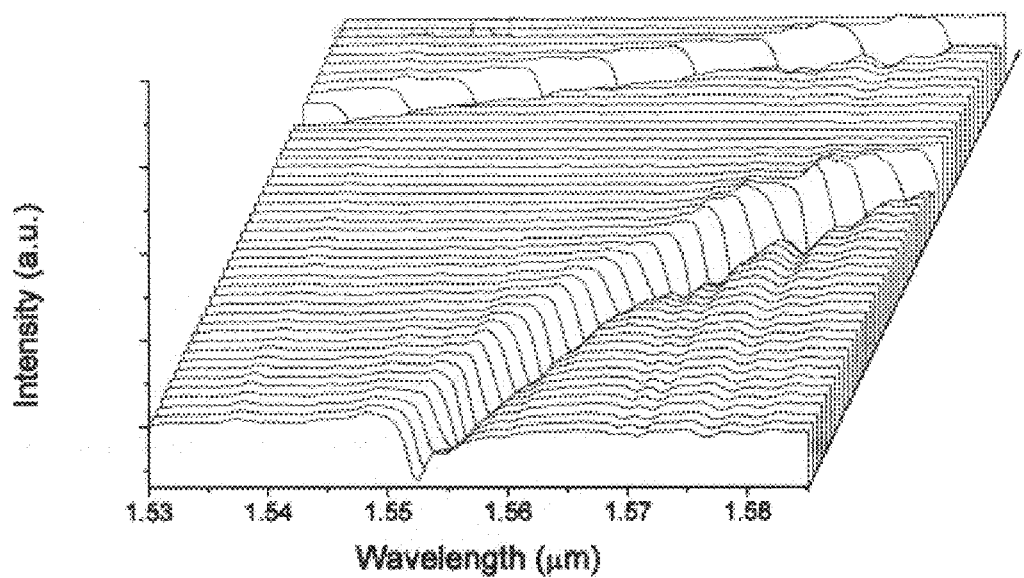
FIGS. 21a, 21b show comparable simulator and spectral measurement data for operation as notch filter.
Figure 21B:
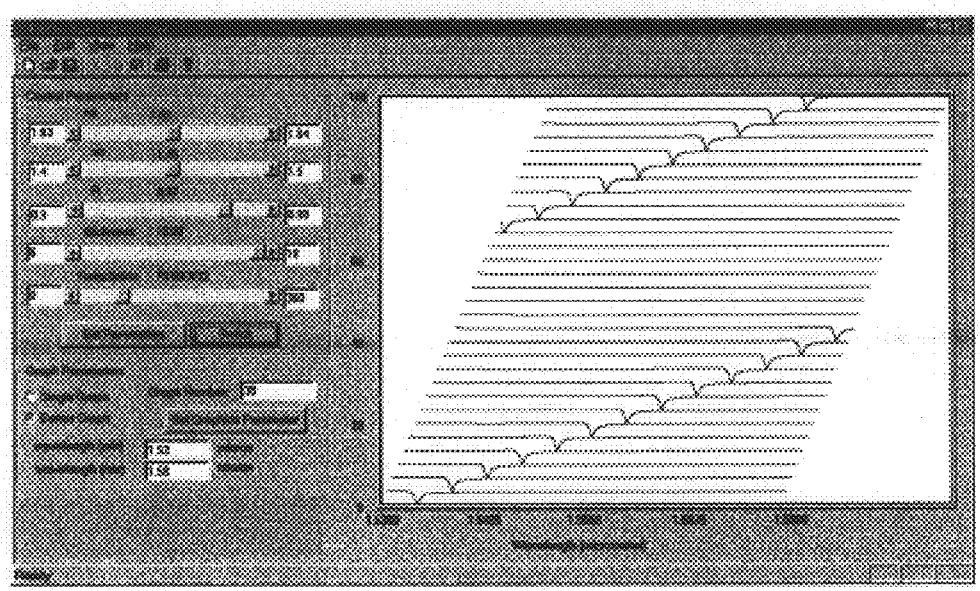

The traces in FIGS. 21a and 21b are an experimental measurement and a simulation of use of the invention as a notch filter, namely to exclude a tunably controlled wavelength component $\omega_d$. This result is obtained, for example, by inserting a quarter wave plate between the polarization separator and the reflective Fabry-Perot in a setup as shown in FIG. 4. The notch filter function can be incorporated into most of the devices that have been described herein, by inserting a polarization rotator at the appropriate position along the beam path, which in essence allows the output polarization to be interchanged, resulting in a (1-T) transfer function, where "T" is the transfer function without the polarization rotation device.

Figure 22:
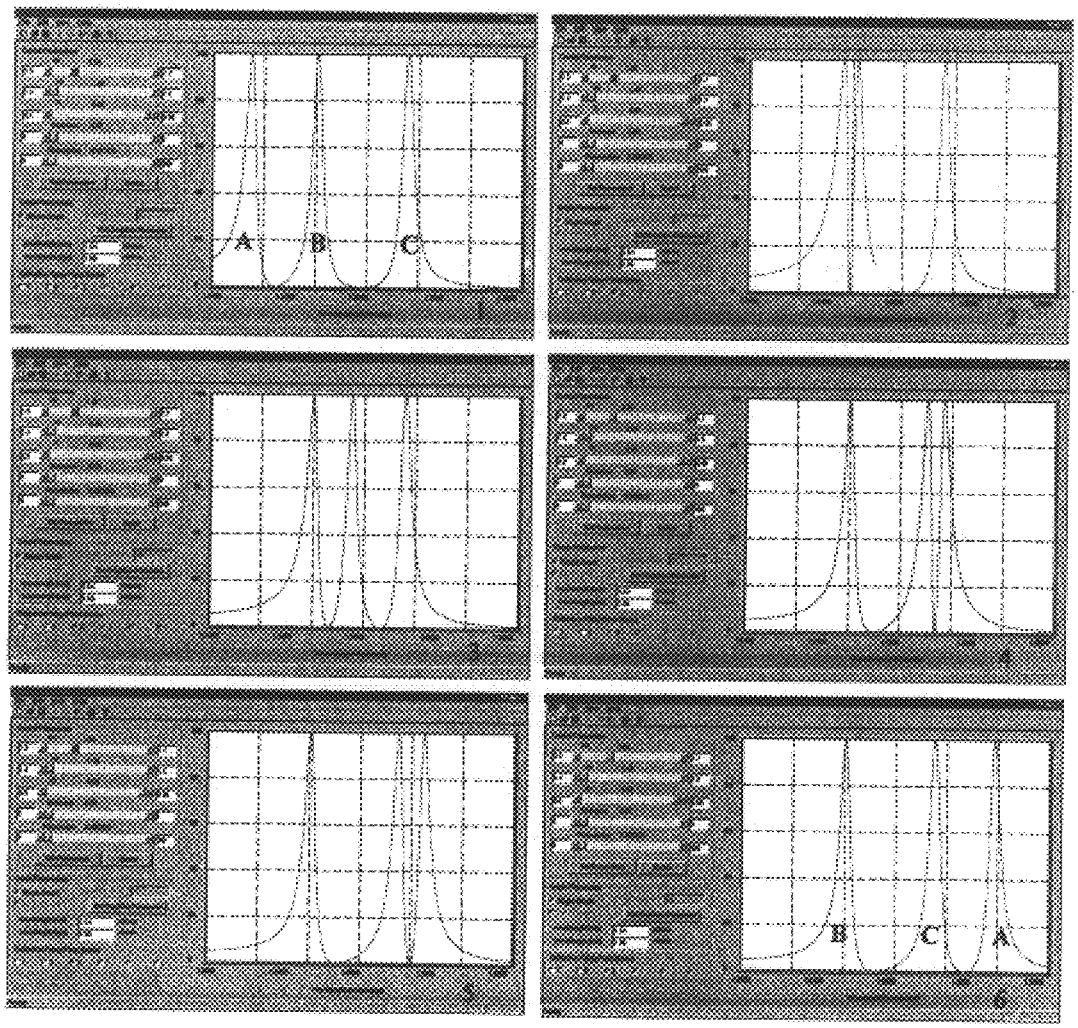
FIGS. 22 and 23 show simulator outputs for several examples of cascaded arrangements as discussed below.
Figure 23:
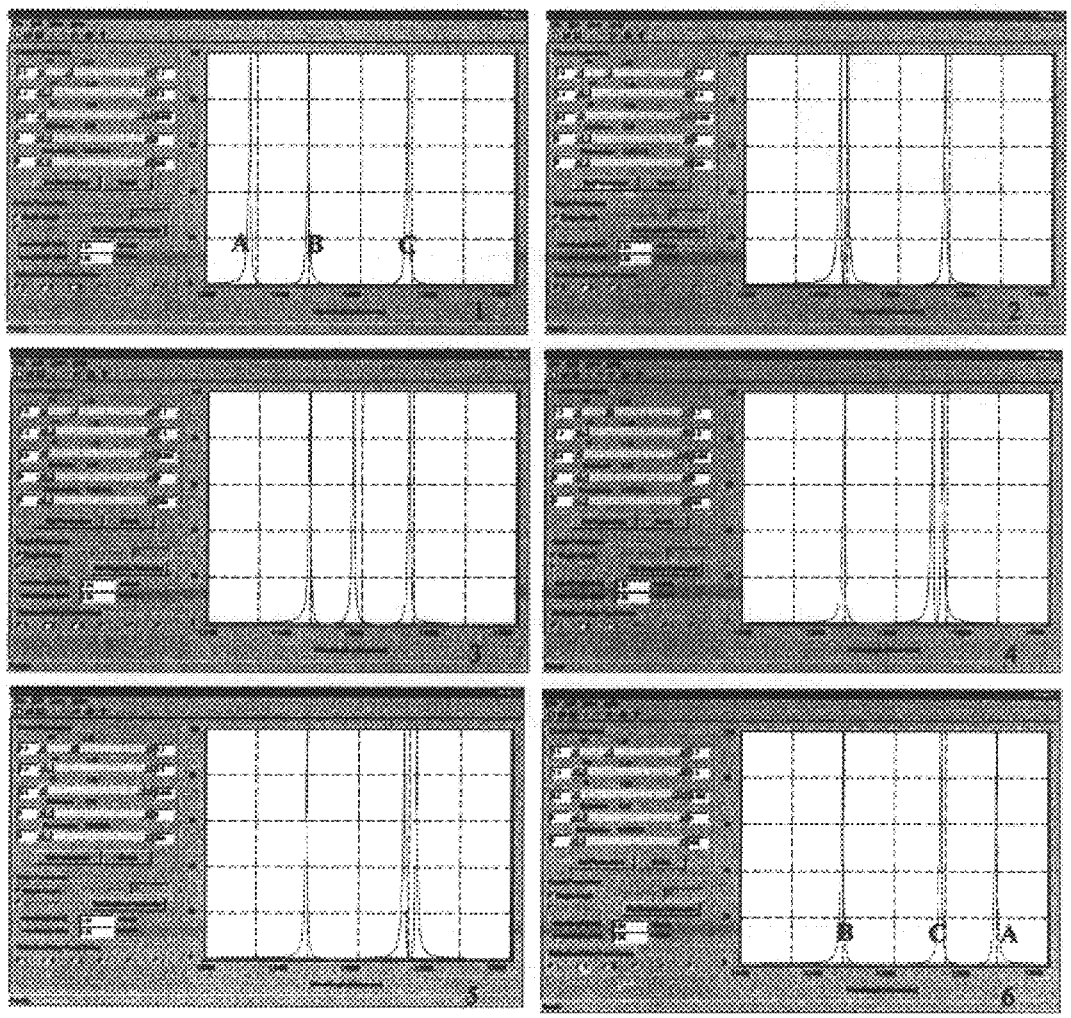

FIGS. 22 and 23 show similar results obtained by cascading the polarization encoding of different wavelengths as demonstrated using the simulator. The beam is simply passed through successive devices, each of which encodes at least one additional wavelength $\omega_{d'\cdot n'}$. Each of the devices also carries forward any polarization encoding caused by the operation of previous stages. The final separation or other decoding at the end of the process is accomplished using a polarization decoder or beam splitter, etc.

In FIG. 22, the reflectivity was set at 99% using the simulator variable inputs, resulting in wider peaks than in FIG. 23, where the reflectivity was 99.6%. The expected results are nevertheless shown. Using a three stage simulation, the three stages were independent.

In the examples illustrating the invention herein, embodiments comprising two spaced planar members have typified the structure of the optical interferometer employed with a birefringent element (preferably a tunable birefringence). It should be appreciated that there are other structural forms for optical interfereometers that can be employed in a similar way. For example, instead of two planar reflectors arranged parallel to one another, three reflectors can be arranged in an equilateral triangle. Alternatively, four reflectors can be arranged in a square or another form of regular polygon can be used with any number of sides. Provided that successive reflectors are closely spaced and/or the light is sufficiently coherent that resonance is established in a cavity comprising at least a portion of birefringent material, the apparatus will function as described with any number of sides. In an example with an effectively infinite number of sides forming a curve back to a coupling point, an optical loop can function as the interferometer as well. In a further example, the reflectors defining the cavity boundaries need not be planar and can be hemispherical or otherwise curved so as to provide optical paths of different lengths as a function of alignment. These and other variations are possible and should be readily practiced in view of this disclosure of examples.

The invention having been disclosed with reference to certain preferred embodiments and examples, it will be apparent to persons skilled in the art that the invention and the concepts it entails and demonstrates can be varied. The disclosure of certain examples herein is not intended to exclude such variations. Accordingly, reference should be made to the appended claims rather than the foregoing description of examples, to assess the scope of the invention in which exclusive rights are claimed.

What is claimed is:

1. An apparatus comprising:

an optical interferometer having at least first and second reflectors along a path of an input light beam, the first and second reflectors being spaced along the input beam by a distance equal to an integer number of half wavelengths of a resonant wavelength of the input beam, wherein the second reflector has a reflectivity that is substantially greater than a reflectivity of the first reflector, the first and second reflectors defining a resonant cavity for the resonant wavelength between the reflectors, components of the input beam other then the resonant wavelength being reflected back along the beam path substantially at the first reflector, and components of the input beam at the resonant wavelength resonating in the cavity and being reflected back along the beam path substantially at the second reflector;

wherein at least one birefringent material occupies at least part of the resonant chamber, the birefringent material altering a polarization attribute of the resonant wavelength;

wherein the optical interferometer reflects both the resonant wavelength and the components other than the resonant wavelength backwards along the path of the input beam but the polarization attribute of the resonant wavelength is altered in a manner distinct from the components other than the resonant wavelength.

2. The apparatus of claim 1, wherein at least one said birefringent material in the resonant chamber has controllable birefringence.

3. The apparatus of claim 1, wherein the birefringent material has electrically controllable birefringence.

4. The apparatus of claim 1, wherein the second reflector has a substantially full reflectance, whereby the resonant wavelength is reflected substantially completely reflected back along the beam path.

5. The apparatus of claim 1, wherein the second reflector has a reflectance of at least 99%.

6. The apparatus of claim 1, wherein the birefringent material comprises liquid crystal.

7. The apparatus of claim 3, further comprising an electrical drive operable to apply a driving voltage to the liquid crystal for tuning the birefringent liquid crystal material by changing an effective optical distance between the first and second reflectors.

8. The apparatus of claim 1, wherein said beam path is subdivided into a pixilated array of plural beam paths.

9. The apparatus of claim 1, comprising a pixilated array of said first and second reflectors.

10. The apparatus of claim 9, wherein at least one of the reflectors in the pixilated array is characterized by a reflectivity that is different from a reflectivity of at least one other of the reflectors in the pixilated array.

11. The apparatus of claim 1, further comprising an arrangement for aligning the input beam such that at least part of the input beam is plane polarized along one of a fast axis and a slow axis the birefringent material.

12. The apparatus of claim 11, wherein the input beam has a component aligned substantially at 45 degrees to a fast axis of the birefringent material.

13. The apparatus of claim 1, wherein the input beam has at least one component at the resonant wavelength and aligned to the birefringent material such that the resonant wavelength undergoes a polarization rotation when reflected from the cavity, whereby said at least one component of the resonant wavelength is rendered distinguishable.

14. The apparatus of claim 13, wherein the birefringent material comprises a liquid crystal and the resonant wavelength is tunable by application of an electric field to the liquid crystal for adjustment of an optical path along at least one polarization axis.

15. The apparatus of claim 13, wherein the input beam contains a plane polarized component and is arranged to impinge on the resonator so that an axis of the plane polarized component is substantially at 45 degrees with respect to a fast axis of the birefringent material, and the resonant wavelength undergoes a 90 degree polarization rotation when reflected from the cavity to an output beam.

16. The apparatus of claim 15, further comprising a beam splitter operable to split the output beam as a function of orthogonal linear polarization.

17. The apparatus of claim 16, further comprising means for splitting components from the input light beam as a function of polarization states, and altering at least one of said components such that the components have a predetermined polarization state.

18. The apparatus of claim 17, further comprising means for recombining said components as split from the input light beam.

19. The apparatus of claim 1, further comprising means for splitting components from the input light beam as a function of polarization states, and altering at least one of said components such that the components have a predetermined polarization state.

20. The apparatus of claim 19, further comprising means for recombining said components as split from the input light beam.

21. The apparatus of claim 1, wherein the birefringent material comprises at least one of lithium niobate, PLZT and calcite.

22. A cascaded apparatus comprising
a plurality of polarization encoders along an optical signal path, wherein each of at least two of said encoders comprises a reflective interferometer element having first and second reflectors along a path of an input light beam having a plurality of wavelengths, the first and second reflectors being spaced along the input beam by a distance equal to an integer number of half wavelengths of one of the plurality of wavelengths of the input beam, wherein the second reflector has a reflectivity that is substantially greater than a reflectivity of the first reflector, the first and second reflectors thereby defining a resonant wavelength and a resonant cavity for the resonant wavelength between the reflectors, components of the input beam other then the resonant wavelength being reflected back along the beam path at the first reflector, and the resonant wavelength resonating in the cavity and being reflected back along the beam path substantially at the second reflector;
wherein at least one birefringent material occupies at least part of the resonant cavity, the birefringent material altering a polarization attribute of the resonant wavelength; and,
wherein the interferometer element reflects both the resonant wavelength and the components other than the resonant wavelength backwards along the path of the input beam but the polarization attribute of the resonant wavelength is altered in a manner distinct from the components other than the resonant wavelength.

23. The cascaded apparatus of claim 22, comprising a plurality of said reflective interferometer elements arranged on opposite sides of an apparatus guiding the input beam in a zigzag pattern from one said reflective interferometer element to a next.

24. The cascaded apparatus of claim 22, wherein the reflective interferometer elements comprise at least one Fabry-Perot element having spaced parallel reflectors defining said resonant cavity.

25. The cascaded apparatus of claim 22, wherein the birefringent material at each said optical element comprises liquid crystal material and wherein at least one of said optical elements is tunable by application of an electric field to the liquid crystal material for changing an apparent optical path length between the reflectors.

26. The cascaded apparatus of claim 22, wherein the at least one element responsive to the polarization attribute comprises a beam splitter operative to divert one or both of a polarized component of the input beam that has been polarized in the cavity of at least one of said optical elements and a remainder of the input beam.

27. The cascaded apparatus of claim 22, further comprising an optical element responsive to the polarization attribute and wherein the optical element operates as one of a band-pass filter and a notch filter.

28. The cascaded apparatus of claim 22, further comprising an optical element responsive to the polarization attribute and wherein the optical element is switchable between operation as a band-pass filter and a notch filter.

29. The cascaded apparatus of claim 22, further comprising an optical element responsive to the polarization attribute and wherein the optical element comprises a wave plate.

30. The cascaded apparatus of claim 29, wherein the wave plate provides a retardation of an odd number of quarter wave increments.

31. The cascaded apparatus of claim 29, wherein the wave plate is tunable.

32. The cascaded apparatus of claim 22, wherein the apparatus selectively applies the polarization attribute to selected wavelength components of the input beam by at least one of:
   passing the input beam through one of said optical elements arranged such that particular wavelengths are resonant; and
   tuning at least one of the optical elements such that said particular wavelengths are resonant.

33. The cascaded apparatus of claim 22, wherein the birefringent material in the cavity of at least one of the elements comprises at least one of liquid crystal, polymeric crystal and glassy liquid crystals.

34. The cascaded apparatus of claim 22, wherein the birefringent material in the cavity of at least one of the elements has a birefringence that is tunable.

35. The cascaded apparatus of claim 34, wherein the birefringence is tunable by at least one of an electromagnetic, thermal, electro-optic, acousto-optic, opto-optic, magneto-optic and thermo-optic effect.

36. The cascaded apparatus of claim 22, further comprising means for fixing a polarization alignment of the input beam relative to the birefringent material to a predetermined relative alignment.

37. The cascaded apparatus of claim 36, wherein the predetermined relative alignment is chosen to apply a component of the input beam to a controllable axis of the birefringent material.

38. The cascaded apparatus of claim 36, comprising a polarization diversity combiner operable to divide the input beam as a function of distinct polarization attributes and to combine divided portions of the input beam so as to have equal polarization attributes fixed to said predetermined relative alignment.

39. The cascaded apparatus of claim 22, wherein at least one said birefringent material in the resonant cavity has controllable birefringence.

40. A method for narrow band polarization encoding, comprising:
   distinguishing components of an input light beam to define a plurality of light beams;
   adjusting a phase along at least an adjustable one of said defined light beams to provide an adjusted beam;
   combining the light from the adjusted beam with light from at least one other of said plurality of beams, to provide an output beam;
   wherein said adjusting of said phase comprises passing the adjusted beam through a birefringent material.

* * * * *